United States Patent
Manaharlal Kakkad et al.

(10) Patent No.: US 10,949,653 B2
(45) Date of Patent: Mar. 16, 2021

(54) INTELLIGENT PERSONA GENERATION

(71) Applicant: ACCENTURE GLOBAL SOLUTIONS LIMITED, Dublin (IE)

(72) Inventors: Hemant Manaharlal Kakkad, Mumbai (IN); Nitin Kumar Gupta, Ghaziabad (IN); Rakesh Sharma, Delhi (IN); Sreyas Subramaniam Sankaranarayanan, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 125 days.

(21) Appl. No.: 16/446,206

(22) Filed: Jun. 19, 2019

(65) Prior Publication Data
US 2020/0034605 A1    Jan. 30, 2020

(30) Foreign Application Priority Data
Jul. 24, 2018   (IN) .............................. 201811027770

(51) Int. Cl.
G06K 9/00    (2006.01)
G06N 20/00   (2019.01)

(52) U.S. Cl.
CPC ..... G06K 9/00295 (2013.01); G06K 9/00335 (2013.01); G06K 9/00677 (2013.01); G06K 9/00771 (2013.01); G06N 20/00 (2019.01)

(58) Field of Classification Search
CPC ........... G06K 9/00295; G06K 9/00335; G06K 9/00677; G06K 9/00771; G06N 20/00; G06N 3/08
See application file for complete search history.

(56) References Cited

U.S. PATENT DOCUMENTS

2011/0213737 A1   9/2011  Baughman
2014/0081665 A1   3/2014  Holmes
2018/0018508 A1*  1/2018  Tusch ............... G06K 9/00771

OTHER PUBLICATIONS

Layne et al., "Person Re-identification by Attributes", Queen Mary Vision Laboratory, School of Electronic Engineering and Computer Science, Queen Mary, University of London, 2012, 11 pages.

* cited by examiner

Primary Examiner — Ross Varndell
(74) Attorney, Agent, or Firm — Mannava & Kang, P.C.

(57) ABSTRACT

Examples of an intelligent persona generation system are provided. In an example, the system receives an image and an identity creation requirement from a user. The system implements an artificial intelligence component to sort the sort the image into a plurality of objects. The system may identify a principal object from evaluation of the plurality of objects. The system may identify at least one parameter associated with the identity creation requirement and receive associated parameter data from a pre-existing library coupled to the processor. The system may determine a parameter set from the parameter data, associated with the principal object by performing a first cognitive learning operation. The system may implement a second cognitive learning operation on the principal object and the parameter set associated with the principal object to determine an identity model indicative of an identity creation relevant for processing the identity creation requirement.

18 Claims, 12 Drawing Sheets

INTELLIGENT PERSONA GENERATION

PRIORITY CLAIM

This application claims priority from Indian provisional application number 201811027770 filed on Jul. 24, 2018, the disclosure of which is incorporated by reference in its entirety herein.

BACKGROUND

The importance of artificial intelligence (AI) as a policy-making tool has increased significantly in recent times. For example, AI may be used to determine the needs of a particular demographic in a certain geographical region. In particular, AI may be used to determine the presence of homeless people and develop specific policies for them. Presently, countries have developed various mechanisms for identifying residents. These mechanisms include, for example, a Social Security Number (SSN) as used in the United States or an Aadhar card as used in India. In additions, organizations such as, for example, ID2020, provide shelter and sustenance for refugees by creating a secure ID for each refugee. However, such methods do not account for people who may be homeless and thus do not have permanent contact information or people who suffer from a mental illness, which prevents them from remembering their personal information. For example, providing any kind of identity card to a homeless person who is also suffering from a mental illness like dementia may not be worthwhile. Such a person may not be capable of handling an identity card, and may not be able to produce the same when required by an organization or governmental authorities. Also, most identity cards like SSN, and Aadhar card require a postal address to be mentioned onto the card itself, thereby limiting the applicability of such cards for homeless people.

A sizeable number of homeless people suffer from Dementia, which makes them partially or totally incapable of handling their own identity. Various social organizations may act as guardians for such people and may identify them based on various attributes such as habits, description, favorite places to roam and the like. However, most organizations may not be able to keep track of such people due to inadequacies in their identification system. There may therefore be a need for an identification system, which may be applied to identify and sort people such as for example, homeless people, with no contact information in an accurate and efficient manner. There may also be a need for a persona generation system that can account for diverse factors such as demographics, facial features of people, mental condition of people, and geographical location to accurately identify people.

Accordingly, a technical problem with the currently available identification generation system is that they may be inefficient, inaccurate, and/or not scalable. There is a need for a real-time intelligence persona generation system that can account for the various factors mentioned above, amongst others, to generate a unique persona for each individual despite the individual not having permanent contact details.

DETAILED DESCRIPTION

Figure 1:
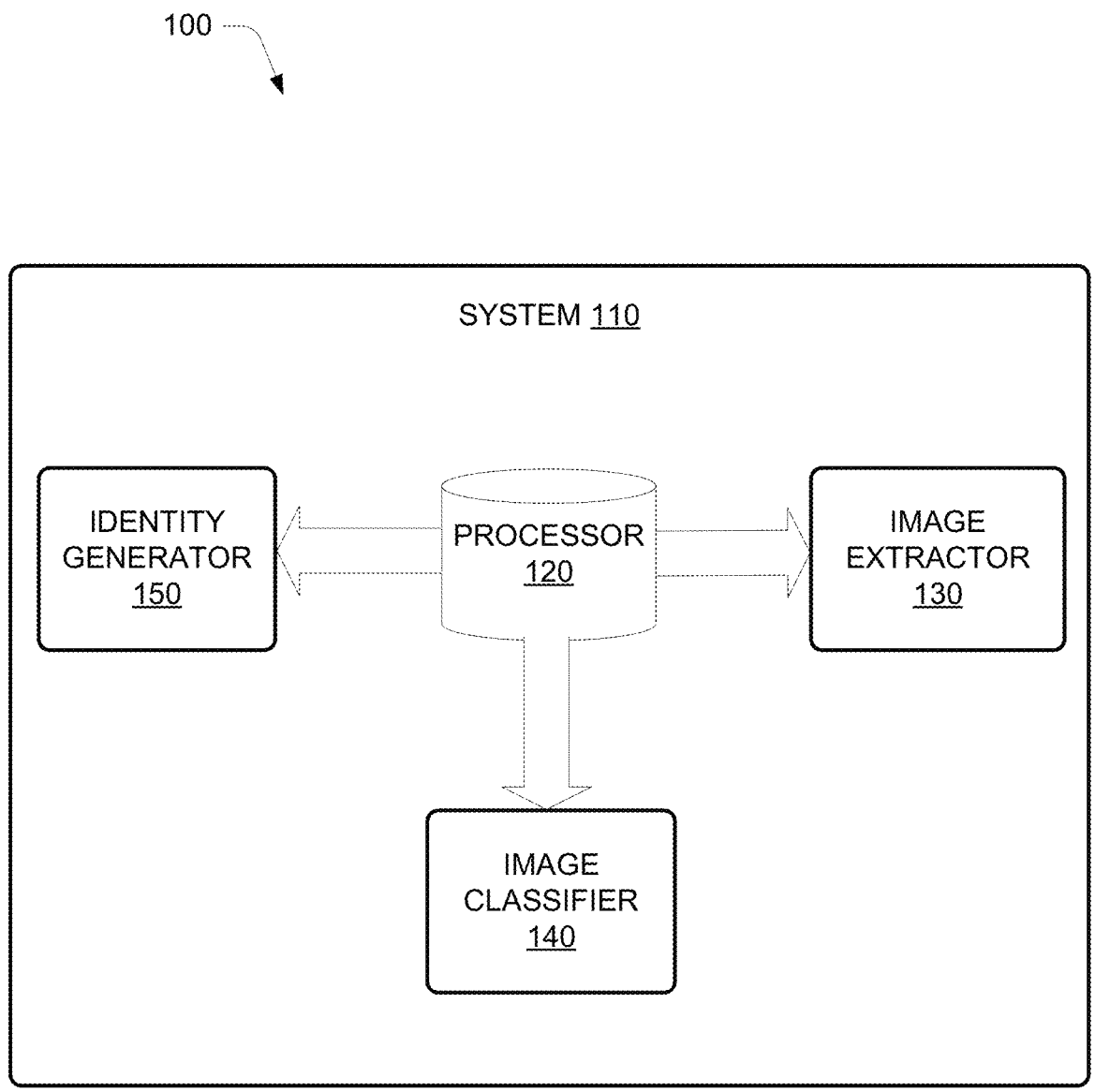
FIG. 1 illustrates a diagram for a system for an intelligent persona generation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for an intelligent persona generation system (IPGS). The intelligent persona generation system (referred to as "system" hereinafter) may be used to generate a persona for a homeless person through a contactless process implementing various artificial intelligence and machine learning tools and techniques and considering a variety of factors critical to identifying needs of people for making policy decisions. For example, the system may be used to identify people who do not know their identity due to a mental illness and/or may be homeless. The system may be used for creating a persona by using AI techniques to help identify a person by demographic and physical attributes. In such a process, active participation of applicant may not be a necessity. The system may help homeless people suffering from disorders like dementia. The system may be used for civil society engagement of the homeless and integrate them into benefit schemes offered by various governments. For example, the system may link a person with a foster organization such as, for example, various shelter homes, health services and the like. The system may be used for transferring Non-Governmental Organization (NGO) ownership of a person. The system may facilitate the establishment of a Living Identification Number (LiveID) through the persona generation process. The LiveID may describe a complete person to help determine sustenance and help required for the person. The LiveID may not be based on the human ability to respond and prove his or her identity in the form of documents, biometrics, and the like. This may set a threshold for acceptance by the public agencies especially for that part of the population, who may not be capable of handling and proving their identity and are unable to participate in the program. The LiveID may be used by the agencies for enrolling such populace as the part of any welfare program. The system may facilitate temporary human influx management for situations where there may be an influx of humans is expected like a natural disaster relief camp or a safe house. All conventional and formal methods of document verification may be found insufficient for such cases. The focus of public safety agencies may be to mainly account for all humans arriving and their well-being. The LiveID may be used to create a live database on persons arrived and also provide the public safety agencies a method to trace them with the help of the common population. For example, the system may be used for efficient refugee management. The language barriers and complete lack of documentation may be a problem of aid agencies while dealing with homeless persons. The LiveID may provide them with an ability to monitor the vulnerable groups with different intensities to devise a proper response. The system may be used for tracking and tracing juveniles, who may be prone to violent acts against them or sometimes drawn towards extreme crimes due to being left alone. A profile created on their entry to juvenile homes may facilitate tracking such people when they may be released under the care of childcare agencies for rehabilitation.

The system may include a processor, an image extractor, an image classifier, and an identity generator. The processor may be coupled to the image extractor, the image classifier, and the identity generator. The image extractor may be configured to receive an image from a plurality of sources. The image may be pertaining to processing an identity creation requirement associated with at least one person. The image extractor may implement an artificial intelligence component to sort image into a plurality of objects. The image extractor may evaluate each object from the plurality of objects to identify a principal object pertaining to processing the identity creation requirement.

The image classifier identifies at least one parameter associated with the identity creation requirement and receives parameter data associated with the identity creation requirement from a pre-existing library coupled to the processor. The image classifier may identify the principal object pertaining to processing the identity creation requirement. The image classifier may implement a first cognitive learning operation to determine a parameter set from the parameter data, the parameter set to be associated with the principal object. In an example, the parameter data present in the pre-existing library is to further include at least one of a geographical location, a sustaining organization, an age group, and a linguistic preference for the principal object.

The identity generator may obtain the parameter set associated with the principal object. The identity generator may implement a second cognitive learning operation on the principal object and the parameter set associated with the principal object to determine an identity model indicative of an identity creation associated with the principal object relevant for processing the identity creation requirement. In an example, the identity generator may further implement the second cognitive learning operation to predict at least one of a medical condition, an age group, a visible anatomy code, a gender, and a linguistic preference of the principal object.

The identity generator may generate an identification number corresponding to the identity creating requirement by deploying the identity model, the identification number comprising the resolution to the identity creation. In an example, the identification number may further include information on at least one of a geographical location, a sustaining organization, a medical condition, an age group, a visible anatomy code, a gender, and a linguistic preference of the principal object. Further, the identity generator may implement the second cognitive operation to determine a criticality indicator for indicating a level of distress of the principal object. The system may provide a remedial action based on the level of distress of the principal object indicated by the criticality indicator. The identity generator may further implement the second cognitive operation to determine a change in the level of distress of the principal object indicated by the criticality indicator.

The embodiments for the identity creation requirements presented herein are exemplary in nature and should be treated as such. For the sake of brevity and technical clarity, the description of the intelligent persona generation system may be restricted to few exemplary embodiments, however, to a person skilled in the art it should be clear that the system may be used for the fulfillment of various contactless identity creation requirements other than those mentioned hereinafter.

Accordingly, the present disclosure aims to provide an intelligent persona generation system which will consider the appropriate set of criteria, real-time fluctuations, and impact of the criteria to generate a unique persona for each individual whose parameters are processed by the intelligent persona generation system. The present disclosure also provides for efficient and continuous analysis of data required for various persona generation processes, which in turn provides for continuous, efficient, and accurate analysis of the identity creation requirements of a user. Furthermore, the present disclosure may analyze various categories of persona generation data, to accurately interpret parameters such as, for example, facial features, the possibility for medical disorders, and the like to generate a unique id for each person.

FIG. 1 illustrates a system for intelligent persona generation system 110 (referred to as system 110 hereinafter), according to an example implementation of the present disclosure. In an example, the system 110 may include a processor 120. The processor 120 may be coupled to an image extractor 130, an image classifier 140 and an identity generator 150.

In accordance with an embodiment of the present disclosure, the image extractor 130 may be configured to receive an image from a plurality of sources. The plurality of sources may include, for example, capturing images of homeless people around a particular geographical location. In accordance with an embodiment of the present disclosure, the plurality of data sources may include various images taken by various users of the system 110 across various geographical locations. The image may be pertaining to processing an identity creation requirement associated with at least one person. In an example, the identity creation requirement may indicate a requirement, which may refer to a purpose of persona generation. For example, the purpose may be to access requirements of refugees in a refugee camp. The purpose of the persona generation may be to understand the requirements of homeless people in a particular demographic region or a geographical location. The purpose of the persona generation may development of policies and welfare schemes for homeless people suffering from various types of mental illness. The purpose of the persona generation may be to categorize various homeless people based on their specific requirements. For example, the categorization may lead to the identification of a number of people requiring medical facilities, and the like. The embodiments for the identity creation requirements presented herein are exemplary in nature and should be treated as such. For the sake of brevity and technical clarity, the description of the intelligent persona generation system may be restricted to few exemplary embodiments, however, to a person skilled in the art it should be clear that the system 110 may be used for the fulfillment of various identity creation requirements other than those mentioned hereinafter.

The image extractor 130 may implement an artificial intelligence component to sort image into a plurality of objects. The artificial intelligence component may include extraction and normalization of an image of the homeless person from the image obtained from the plurality of sources. The plurality of objects may include various objects of an image bounded as different boxes for distinguishing various objects, which may be present in an image. For example, an image may be captured depicting a homeless person and a surrounding environment comprising various objects like a pavement, various food items, a vehicle, a retail outlet, and the like. The artificial intelligence component may sort the image such that boxes may be drawn around each of the faces of the homeless person and each object from the surrounding environment. The image extractor 130 may evaluate each object from the plurality of objects to identify a principal object pertaining to processing the identity creation requirement. In an example, the principal object may be the facial features of a human being.

In an example, the artificial intelligence component may include deep neural networks (DNN). The DNN may be an Artificial Neural Network (ANN) with multiple layers between the input and output layers. The DNN may be configured to find the correct mathematical manipulation to turn the input into the output, whether it be a linear relationship or a non-linear relationship. The network may move through the layers present between the input and the output calculating the probability of each output. For example, a DNN that is trained to recognize human faces will go over the given image and calculate the probability that a human face may be present in the image. The DNN may further be trained to recognize and calculate gender identification indicators, clinical indicators for a medical condition, an age group identification, and facial attributes from the face of the person present in the image obtained from the plurality of objects. The user may review the results and select which probabilities the network should display (above a certain threshold) and return the proposed label. The DNN may be configured so that eventually, the DNN may be trained to decompose an image into features, identify trends that exist across all samples and classify new images by their similarities without requiring human input.

In an example, the artificial intelligence component may include fully convolutional neural network (CNN). CNN may be configured to be applied to analyzing visual imagery. The CNN may extract the principal object, for example, human face information for classification, identification, and taxonomizing facial features of the intended subject from the plurality of objects depicted by the image obtained from the plurality of sources as mentioned above.

As mentioned above, image extractor 130 may evaluate each object from the plurality of objects to identify the principal object pertaining to processing the identity creation requirement. In an example, the principal object may be an object from the plurality of objects, which might have a greater prevalence over other objects from the plurality of objects for processing the identity creation requirement. In an example, the principal object may be an image of a face of a person identified through the implementation of the artificial intelligence component which may be classified by the image extractor 130 as being most important for processing the identity creation requirement. As mentioned above, the system 110 may analyze a variety of factors critical to contactless identification establishment of a person. Accordingly, the system 110 may identify at least one object from the plurality of objects as being a preponderant object for the identity creation requirement (explained in detail by way of subsequent Figs. along with exemplary embodiments). In an example, the principal object may be a human face. In an example, the system 110 may identify a new principal object for processing each identity creation requirement.

The image classifier 140 may identify at least one parameter associated with the identity creation requirement and receive parameter data associated with the identity creation requirement from a pre-existing library coupled to the processor. In an example, the parameter may be external features of a person, a linguistic preference of a person, a geographical location of a person, and the like. In an example, the parameter data further comprise researching various factors like features of the principal object. In an example, the features of the principal object may include skin color, skin textures, presence or absence of puffiness around eyes, presence or absence of acne, cracked mouth corners, frontal bone enlargement, deviation in lips and the like. In an example, the parameter data may be a set of historical data stored in the system 110, which may be accessed by the system 110 for processing the identity creation requirement. For example, parameter data related to a particular geographical region may be stored in the system 110. The parameter data related to the particular geographical region may include data on linguistic preference for people living in that demographic area.

The image classifier 140 may identify the principal object pertaining to processing the identity creation requirement. In an example, the image classifier 140 may obtain the principal object identified for processing the identity creation requirement from the image extractor 130. The image classifier 140 may implement a first cognitive learning operation to determine a parameter set from the parameter data, the parameter set to be associated with the principal object. The parameter set may include a measurable factor, which may be forming one of a set that may define a condition for processing the identity creation requirement. In an example, the parameter set may include multiple measurable factors that would have an impact on the purpose of the identity creation requirement. For example, the purpose of the persona generation may be to create contactless identities for homeless people suffering from a mental illness for a particular geographical location. The image classifier 140 may search through the pre-existing library and identify measurable factors like gender, facial features, language preference for people in that geographical area. In such an example, the measurable factors may constitute the parameter associated with the identity creation requirement. The data stored in the pre-existing library for each of the parameters may constitute the parameter data. For example, the image classifier 140 may identify different linguistic preferences which may have been observed in people living in a particular geographical location. The image classifier 140 may access the historical data stored in the system 110 for identifying various categories, including the linguistic preference or facial feature composition. Further, the image classifier 140 may identify other measurable factors (not mentioned herein), which may be relevant for the processing the identity creation requirement of creating contactless identities for homeless people suffering from a mental illness for a particular geographical location (explained further in detail with more exemplary embodiments by way of subsequent Figs.).

In an example, image classifier 140 may establish the pre-existing library, by associating the principal object and the identified parameter set with the identity creation requirement. In an example, a user may establish the pre-existing library using various test cases. The test cases may include creating contactless identification for various principal objects from various demographic regions. The test cases may include faces of various volunteers from different demographic regions as principal objects. The identified parameter set for test cases may include linguistic preference and facial feature composition of various people from that particular demographic region. For example, the system 110 may identify a parameter set for a particular identity creation requirement. Additionally, the system 110 would also identify a set of the principal object for that particular identity creation requirement. The image classifier 140 may be configured to associate the identified parameter set and the identified principal object for that specific identity creation requirement. The system 110 may store the identified parameter set with the associated principal object in the forecast library. The system 110 may access the pre-existing library for using the identified parameter set with the associated principal object for processing a similar identity creation requirement in future (further explained by way of subsequent Figs.).

In an example, the parameter set may be identified through application of a set of category intelligence operations on the principal object. The category intelligence operations may include identification of all measurable factors associated with the purpose of the identity creation requirement (further explained by way of subsequent Figs.). In an example, the system 110 may identify a new parameter set for processing each identity creation requirement. In an example, the parameter set identified for an identity creation requirement may include at least one set that has been pre-set by a user. For example, the user may define a parameter set to include parameters like a geographical location, a gender information, an age group information, a medical condition information and the like. In an example, the parameter data present in the pre-existing library may further include at least one of a geographical location, a sustaining organization, an age group, and a linguistic preference for the principal object. In some cases, the principal object may require an update based on new information available through the parameter data. In an example, the system 110 may require permission from the user for updating the parameter set based on new information available through the parameter data for the associated principal object.

In accordance with various embodiments of the present disclosure, the first cognitive learning operation may include the CNN, landmark localization, face formalization, random tree methods, and the like. In an example, the first cognitive learning operation may include a supervised machine learning algorithm like Support Vector Machine (SVM). The first cognitive learning operation may include various algorithms for training the system 110. The training algorithms may include Generalized Linear Models (LM), K-nearest neighbors (KNN), Support Vector Machines (SVM), Forests of randomized trees (RT), Convolutional Neural Network (CNN). In an example, a generalized method is used to combine the predictions of the basic estimators including the LM, KNN, SVM, RT, and CNN to achieve higher classification accuracy, better generalizability and robustness in the system 110 (explained in detail by way of subsequent Figs.).

The identity generator 150 may obtain the parameter set associated with the principal object from the image classifier 140. The identity generator 150 may implement a second cognitive learning operation on the principal object and the parameter set associated with the principal object to determine an identity model indicative of an identity creation associated with the principal object relevant for processing the identity creation requirement. The second cognitive learning operation may include various deep learning and machine learning methods, which would be explained in detail by way of subsequent Figs. The second cognitive learning operation may be aimed at amalgamating the parameter set with the principal object for determining the identity model. In accordance with an embodiment of the present disclosure, the identity model may include identification of a set of dynamic and static parameters and accompanying parameter data for the principal object. For example, as mentioned above, the first cognitive learning operation would identify and determine various parameters, which may be associated with the principal object. Also, the first cognitive learning operation would retrieve parameter data from the pre-existing library. The second cognitive learning operation would identify and associate the parameter data retrieved by the first cognitive learning operation with the principal object for determination of the identity model. In an example, the identity model may include various components, which may be based on parameters that may be fixed for a particular demographic area, for example, geographical location, linguistic preference and the like. The identity model may include various components, which may be based on parameters that may be unique to each principal object irrespective of demographic location, for example, facial features, medical conditions, and the like. In an example, the identity generator 150 may further implement the second cognitive learning operation to predict at least one of a medical condition, an age group, a visible anatomy code, a gender, and a linguistic preference of the principal object.

The identity generator 150 may generate an identification number corresponding to the identity creating requirement by deploying the identity model. The identification number may be comprising the resolution to the identity creation requirement. In an example, the identification number may further include information on at least one of a geographical location, a sustaining organization, a medical condition, an age group, a visible anatomy code, a gender, and a linguistic preference of the principal object (explained further by way of subsequent Figs). Further, the identity generator 150 may implement the second cognitive operation to determine a criticality indicator for indicating a level of distress of the principal object. In an example, the level of distress may include a normal distress level, an intermediate distress level, and a severe distress level. For example, if a person may not appear to be suffering from a physical or a mental condition, the criticality indicator may determine the level of distress to be at the normal distress level. If a person may appear to be suffering from at least one a physical or a mental condition, the criticality indicator may determine the level of distress to be at the intermediate distress level. If a person may appear to be suffering from both of a physical and a mental condition, the criticality indicator may determine the level of distress to be at the severe distress level. The system 110 may provide a remedial action based on the level of distress of the principal object indicated by the criticality indicator. The identity generator 150 may further implement the second cognitive operation to determine a change in the level of distress of the principal object indicated by the criticality indicator.

Figure 2:
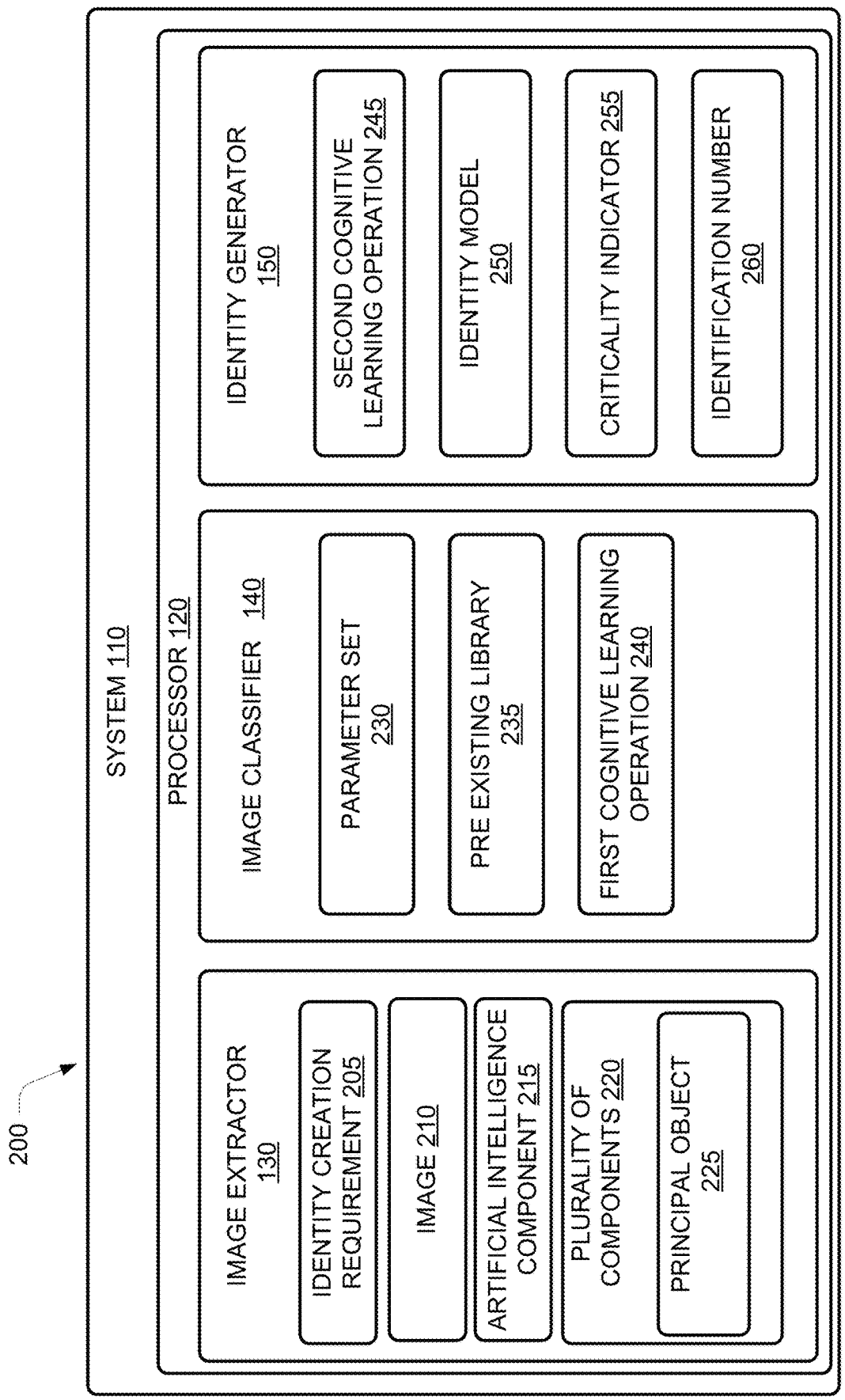
FIG. 2 illustrates various components of the system for the intelligent persona generation system, according to an example embodiment of the present disclosure.

FIG. 2 illustrates various components of the system 110 for an intelligent persona generation system, according to an example embodiment of the present disclosure. In an example, the system 110 may include a processor 120. The processor 120 may be coupled to the image extractor 130, the image classifier 140 and the identity generator 150.

In accordance with an embodiment of the present disclosure, the image extractor 130 may be configured to receive an image 210 from a plurality of sources. The plurality of sources may include, for example, capturing images 210 of homeless people around a particular geographical location. In accordance with an embodiment of the present disclosure, the plurality of data sources may include various images 210 taken by various users of the system 110 across various geographical locations. The image 210 may be pertaining to processing an identity creation requirement 205 associated with at least one person. In an example, the identity creation requirement 205 may indicate a requirement, which may refer to a purpose of persona generation. For example, the purpose may be to access requirements of refugees in a refugee camp. The purpose of the persona generation may be to understand the requirements of homeless people in a particular demographic region or a geographical location. The purpose of the persona generation may development of policies and welfare schemes for homeless people suffering from various types of mental illness. The purpose of the persona generation may be to categorize various homeless people based on their specific requirements. For example, the categorization may lead to the identification of a number of people requiring medical facilities, and the like. The embodiments for the identity creation requirement 205 presented herein are exemplary in nature and should be treated as such. For the sake of brevity and technical clarity, the description of the intelligent persona generation system may be restricted to few exemplary embodiments, however, to a person skilled in the art it should be clear that the system 110 may be used for the fulfillment of various identity creation requirements 205 other than those mentioned hereinafter.

The image extractor 130 may implement an artificial intelligence component 215 to sort image 210 into a plurality of objects 220. The artificial intelligence component 215 may include extraction and normalization of an image 210 of the homeless person from the image 210 obtained from the plurality of sources. The plurality of objects 220 may include various objects of an image 210 bounded as different boxes for distinguishing various objects, which may be present in an image 210. For example, an image 210 may be captured depicting a homeless person and a surrounding environment comprising various objects like a pavement, various food items, a vehicle, a retail outlet, and the like. The artificial intelligence component 215 may sort the image 210 such that boxes may be drawn around each of the faces of the homeless person and each object from the surrounding environment. The image extractor 130 may evaluate each object from the plurality of objects 220 to identify a principal object 225 pertaining to processing the identity creation requirement 205. In an example, the principal object 225 may be facial features of a human being.

In an example, the artificial intelligence component 215 may include deep neural networks (DNN). The DNN may be an artificial neural network (ANN) with multiple layers between the input and output layers. The DNN may be configured to find the correct mathematical manipulation to turn the input into the output, whether it be a linear relationship or a non-linear relationship. The network may move through the layers present between the input and the output calculating the probability of each output. For example, a DNN that is trained to recognize human faces will go over the given image 210 and calculate the probability that a human face may be present in the image 210. The DNN may further be trained to recognize and calculate gender identification indicators, clinical indicators for a medical condition, an age group identification, and facial attributes from the face of the person present in the image 210 obtained from the plurality of objects 220. The user may review the results and select which probabilities the network should display (above a certain threshold) and return the proposed label. The DNN may be configured so that eventually, the DNN may be trained to decompose an image 210 into features, identify trends that exist across all samples and classify new images 210 by their similarities without requiring human input.

In an example, the artificial intelligence component 215 may include fully convolutional neural network (CNN). CNN may be configured to be applied to analyzing visual imagery. The CNN may extract the principal object 225 for example, human face information for classification, identification, and taxonomizing facial features of the intended subject from the plurality of objects 220 depicted by the image 210 obtained from the plurality of sources as mentioned above.

As mentioned above, image extractor 130 may evaluate each object from the plurality of objects 220 to identify the principal object 225 pertaining to processing the identity creation requirement 205. In an example, the principal object 225 may be an object from the plurality of objects 220, which might have a greater prevalence over other objects from the plurality of objects 220 for processing the identity creation requirement 205. In an example, the principal object 225 may be an image 210 of a face of a person identified through the implementation of the artificial intelligence component 215 which may be classified by the image extractor 130 as being most important for processing the identity creation requirement 205. As mentioned above, the system 110 may analyze a variety of factors critical to contactless identification establishment of a person. Accordingly, the system 110 may identify at least one object from the plurality of objects 220 as being a preponderant object for the identity creation requirement 205 (explained in detail by way of subsequent Figs. along with exemplary embodiments). In an example, the principal object 225 may be a human face. In an example, the system 110 may identify a new principal object 225 for processing each identity creation requirement 205.

The image classifier 140 may identify at least one parameter associated with the identity creation requirement 205 and receive parameter data associated with the identity creation requirement 205 from a pre-existing library 235 coupled to the processor. In an example, the parameter may be external features of a person, a linguistic preference of a person, a geographical location of a person, and the like. In an example, the parameter data further comprise researching various factors like features of the principal object 225. In an example, the features of the principal object 225 may include skin color, skin textures, presence or absence of puffiness around eyes, presence or absence of acne, cracked mouth corners, frontal bone enlargement, deviation in lips and the like. In an example, the parameter data may be a set of historical data stored in the system 110, which may be accessed by the system 110 for processing the identity creation requirement 205. For example, parameter data related to a particular geographical region may be stored in the system 110. The parameter data related to the particular geographical region may include data on linguistic preference for people living in that demographic area.

The image classifier 140 may identify the principal object 225 pertaining to processing the identity creation requirement 205. In an example, the image classifier 140 may obtain the principal object 225 identified for processing the identity creation requirement 205 from the image extractor 130. The image classifier 140 may implement a first cognitive learning operation 240 to determine a parameter set 230 from the parameter data, the parameter set 230 to be associated with the principal object 225. The parameter set 230 may include a measurable factor, which may be forming one of a set that may define a condition for processing the identity creation requirement 205. In an example, the parameter set 230 may include multiple measurable factors that would have an impact on the purpose of the identity creation requirement 205. For example, the purpose of the persona generation may be to create contactless identities for homeless people suffering from a mental illness for a particular geographical location. The image classifier 140 may search through the pre-existing library 235 and identify measurable factors like gender, facial features, language preference for people in that geographical area. In such an example, the measurable factors may constitute the parameter associated with the identity creation requirement 205. The data stored in the pre-existing library 235 for each of the parameters may constitute the parameter data. For example, the image classifier 140 may identify different linguistic preferences which may have been observed in people living in a particular geographical location. The image classifier 140 may access the historical data stored in the system 110 for identifying various categories, including the linguistic preference or facial feature composition. Further, the image classifier 140 may identify other measurable factors (not mentioned herein), which may be relevant for the processing the identity creation requirement 205 of creating contactless identities for homeless people suffering from a mental illness for a particular geographical location (explained further in detail with more exemplary embodiments by way of subsequent Figs.).

In an example, image classifier 140 may establish the pre-existing library 235, by associating the principal object 225 and the identified parameter set 230 with the identity creation requirement 205. In an example, a user may establish the pre-existing library 235 using various test cases. The test cases may include creating contactless identification for various principal objects 225 from various demographic regions. The test cases may include faces of various volunteers from different demographic regions as principal objects 225. The identified parameter set 230 for test cases may include linguistic preference and facial feature composition of various people from that particular demographic region. For example, the system 110 may identify a parameter set 230 for a particular identity creation requirement 205. Additionally, the system 110 would also identify a set of principal object 225 for that particular identity creation requirement 205. The image classifier 140 may be configured to associate the identified parameter set 230 and the identified principal object 225 for that specific identity creation requirement 205. The system 110 may store the identified parameter set 230 with the associated principal object 225 in the forecast library. The system 110 may access the pre-existing library 235 for using the identified parameter set 230 with the associated principal object 225 for processing a similar identity creation requirement 205 in future (further explained by way of subsequent Figs.).

In an example, the parameter set 230 may be identified through application of a set of category intelligence operations on the principal object 225. The category intelligence operations may include identification of all measurable factors associated with the purpose of the identity creation requirement 205 (further explained by way of subsequent Figs.). In an example, the system 110 may identify a new parameter set 230 for processing each identity creation requirement 205. In an example, the parameter set 230 identified for an identity creation requirement 205 may include at least one set that has been pre-set by a user. For example, the user may define a parameter set 230 to include parameters like a geographical location, a gender information, an age group information, a medical condition information and the like. In an example, the parameter data present in the pre-existing library 235 may further include at least one of a geographical location, a sustaining organization, an age group, and a linguistic preference for the principal object 225. In some cases, the principal object 225 may require an update based on new information available through the parameter data. In an example, the system 110 may require permission from the user for updating the parameter set 230 based on new information available through the parameter data for the associated principal object 225.

In accordance with various embodiments of the present disclosure, the first cognitive learning operation 240 may include the CNN, landmark localization, face formalization, random tree methods, and the like. In an example, the first cognitive learning operation 240 may include supervised machine learning algorithm like Support Vector Machine (SVM). The first cognitive learning operation 240 may include various algorithms for training the system 110. The training algorithms may include Generalized Linear Models (LM), K-nearest neighbors (KNN), Support Vector Machines (SVM), Forests of randomized trees (RT), Convolutional Neural Network (CNN). In an example, a generalized method is used to combine the predictions of the basic estimators including the LM, KNN, SVM, RT, and CNN to achieve higher classification accuracy, better generalizability and robustness in the system 110 (explained in detail by way of subsequent Figs.).

The identity generator 150 may obtain the parameter set 230 associated with the principal object 225 from the image classifier 140. The identity generator 150 may implement a second cognitive learning operation 245 on the principal object 225 and the parameter set 230 associated with the principal object 225 to determine an identity model 250 indicative of an identity creation associated with the principal object 225 relevant for processing the identity creation requirement 205. The second cognitive learning operation 245 may include various deep learning and machine learning methods, which would be explained in detail by way of subsequent Figs. The second cognitive learning operation 245 may be aimed at amalgamating the parameter set 230 with the principal object 225 for determining the identity model 250. In accordance with an embodiment of the present disclosure, the identity model 250 may include identification of a set of dynamic and static parameters and accompanying parameter data for the principal object 225. For example, as mentioned above, the first cognitive learning operation 240 would identify and determine various parameters, which may be associated with the principal object 225. Also, the first cognitive learning operation 240 would retrieve parameter data from the pre-existing library 235. The second cognitive learning operation 245 would identify and associate the parameter data retrieved by the first cognitive learning operation 240 with the principal object 225 for determination of the identity model 250. In an example, the identity model 250 may include various components, which may be based on parameters that may be fixed for a particular demographic area, for example, geographical location, linguistic preference and the like. The identity model 250 may include various components, which may be based on parameters that may be unique to each principal object 225 irrespective of demographic location, for example, facial features, medical conditions, and the like. In an example, the identity generator 150 may further implement the second cognitive learning operation 245 to predict at least one of a medical condition, an age group, a visible anatomy code, a gender, and a linguistic preference of the principal object 225.

The identity generator 150 may generate an identification number 260 corresponding to the identity creating requirement by deploying the identity model 250. The identification number 260 may be comprising the resolution to the identity creation requirement 205. In an example, the identification number 260 may further include information on at least one of a geographical location, a sustaining organization, a medical condition, an age group, a visible anatomy code, a gender, and a linguistic preference of the principal object 225 (explained further by way of subsequent Figs). Further, the identity generator 150 may implement the second cognitive operation to determine a criticality indicator 255 for indicating a level of distress of the principal object 225. In an example, the level of distress may include a normal distress level, an intermediate distress level, and a severe distress level. For example, if a person may not appear to be suffering from a physical or a mental condition, the criticality indicator 255 may determine the level of distress to be at the normal distress level. If a person may appear to be suffering from at least one a physical or a mental condition, the criticality indicator 255 may determine the level of distress to be at the intermediate distress level. If a person may appear to be suffering from both of a physical and a mental condition, the criticality indicator 255 may determine the level of distress to be at the severe distress level. The system 110 may provide a remedial action based on the level of distress of the principal object 225 indicated by the criticality indicator 255. The identity generator 150 may further implement the second cognitive operation to determine a change in the level of distress of the principal object 225 indicated by the criticality indicator 255.

In operation, the system 110 may be used to generate an identity for a person through a contactless process. The image extractor 130 may receive the image 210 through the plurality of sources. The plurality of sources may be various locations where people for whom the identities have to be created may be present. The image 210 may be processed by the image extractor 130 through the implementation of the artificial intelligence component 230. The artificial intelligence component 230 may implement techniques such as DNN, and CNN for segregating the image 210 into the plurality of objects 220. The artificial intelligence component 230 may further apply the CNN for identifying and extracting the principal object 225, for example, a human face from the plurality of objects 220 in order to process the identity creation requirement 205. The image classifier 140 of the system 110 may implement the first cognitive operation 240 to identify the parameter set 230 associated with processing the identity creation requirement 205. The parameter set 230 may include a geographical location, a medical condition, a gender identification, an age group identification, a linguistic preference identification, a sustaining organization identification in case of a homeless person, a visible distinguishing mark present upon a person. The image classifier 140 may obtain the parameter data associated with the parameter set 230 from the pre-existing library 235. For example, the pre-existing library 235 might contain data pertaining to various geographical locations, various medical conditions, various linguistic preferences, various gender identification rules, and the like. The system 110 may implement the first cognitive operation 230 to identify the parameter set 230 and obtain relevant parameter data from the pre-existing library 235. The identity generator 150 may obtain parameter set 230 and accompanying data pertaining to the principal object 225 for example, the human face from the pre-existing library 235. The identity generator 150 may implement the second cognitive learning operation 245 to determine the identity model 250. The second cognitive learning operation 245 may be implemented on the principal object 225 and the parameter set 230 associated with the principal object 225. The second cognitive learning operation 245 may obtain match the principal object 225 with the relevant parameter data sections from the parameter data and determine the identity model 250. The identity model 250 may be deployed by the system 110 for generating the identification number 260. The identification number 260 may be formulated so as to include relevant information about the geographical location, the medical condition, the gender identification, the age group identification, the linguistic preference identification, the sustaining organization identification in case of a homeless person, the visible distinguishing mark present upon a person in the number itself. In an example, the identity model 250 may comprise a pattern in which various parameters would be listed to form the identification number 260. Additionally, the identity generator 150 may further implement the second cognitive learning operation 245 to determine the criticality indicator 255 from the identification number 260. As mentioned above, the system 110 may facilitate prediction of a medical condition of a person for whom the identification number 260 may be generated. The criticality indicator 255 may indicate the level of distress of the principal object 225. For example, the criticality indicator 255 may determine that the principal object 225 may be suffering from a mental as well physical disorder and therefore generate a suggestion for a remedial action. The system 110 may be configured so that the identity generator 150 may implement the second cognitive learning operation 245 to determine if there is a change in the distress level of the principal object 225. For example, a person identified as the principal object 225 may not have been suffering from either of a mental or physical disorder, however with the passage of time, the same the principal object 225 may develop a mental or a physical disorder. The system 110 may be configured to access such a change. In an example, the change in distress level may be accessed when a new image like the image 220 may be obtained for the same principal object 225, who was identified earlier to not be suffering from a mental as well as a physical disorder. Therefore, the system 110 may be used for generation of identification numbers for a person through a contactless process. The system 110 may also be used to provide an identity to people who may not be capable of handling or proving their own identity. The details of the artificial intelligence component 230, the first cognitive learning operation 240, and the second cognitive learning operation 245 may be explained in detail by way of subsequent Figs.

Figure 3:
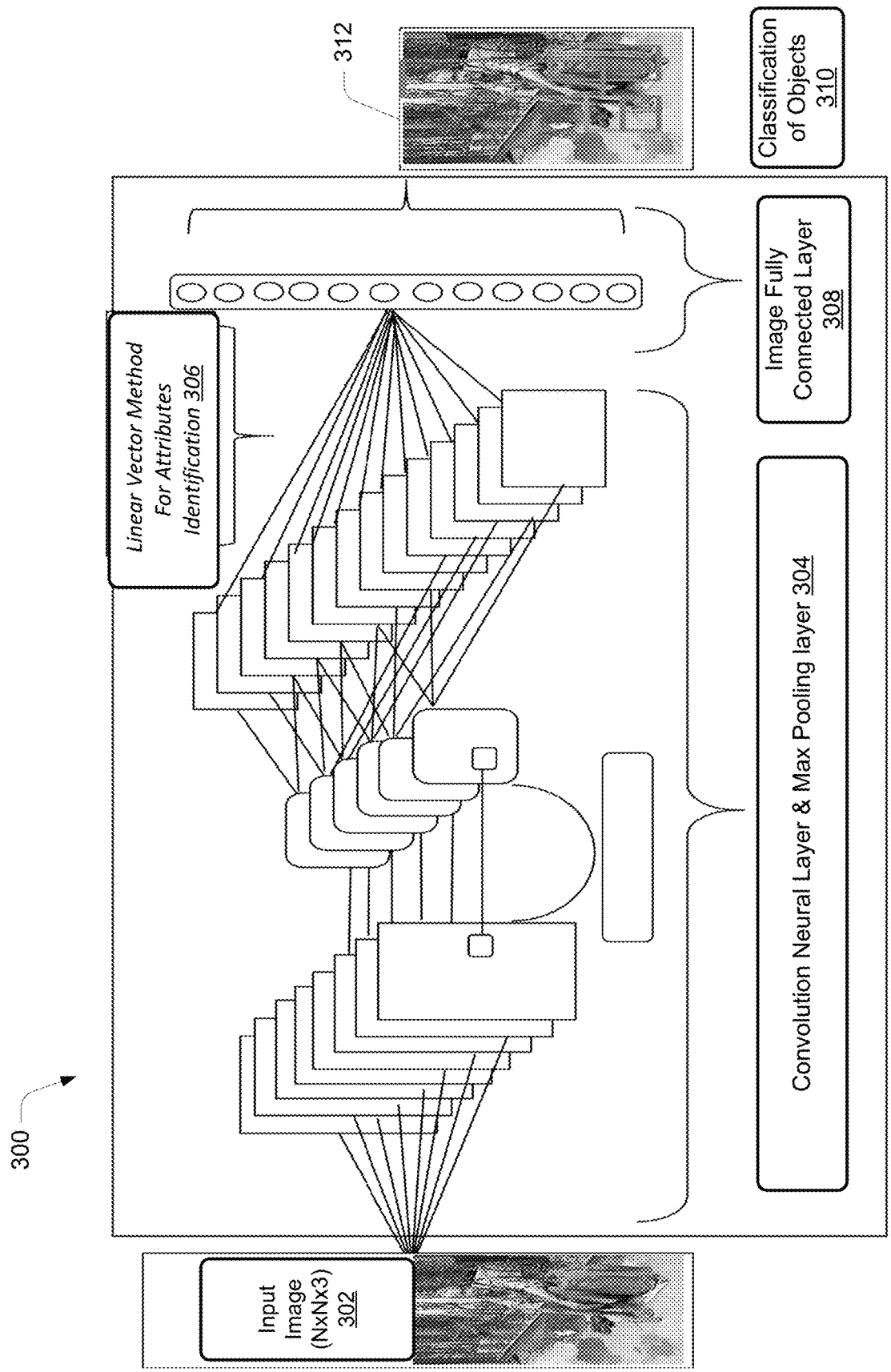
FIG. 3 illustrates a network flow diagram for persona generation using the intelligent persona generation system, according to an example embodiment of the present disclosure.

FIG. 3 illustrates a network flow diagram 300 for sorting the image 210 into a plurality of objects 220 using the intelligent persona generation system (referred to as the system 110 hereinafter), according to an example embodiment of the present disclosure. Any of the components of the system 110 described above by way of FIG. 1, and FIG. 2 may be used for the implementation of the network flow diagram 300.

In accordance with an embodiment of the present disclosure, the network flow diagram 300 may include a Convolutional Neural Network (CNN) 304. The CNN 304 may include a convolution neural layer & max pooling layer. CNN 304 may include local or global pooling layers. The pooling layers may reduce the dimensions of the data by combining the outputs of neuron clusters at one layer into a single neuron in the next layer. The local pooling combines small clusters, typically 2×2. The global pooling acts on all the neurons of the convolutional layer. In addition, pooling may compute a max value or an average. The max pooling uses the maximum value from each of a cluster of neurons at the prior layer. The average pooling uses the average value from each of a cluster of neurons at the prior layer.

The CNN 304 may receive an input 302 from a user of the system 110. In an example, the input 302 may be the image 210. In an example, the captured image may be pre-processed to achieve identification of the principal object 225 i.e. a homeless person. The image 210 may be of a dimension N×N×3 and may be cropped into equal regions. Each region may then be fed to the CNN 304. All pixels of the image 210 may be categorized into categories known as neurons with a pre-defined set of filters with specified dimensions. They may then be mapped to "featured Maps". In an example, the weights assigned to each of the neurons in the featured maps may be equal. In an example, the "featured maps" may be passed to a pooling layer which reduces the dimensionality of the input image 210 by reducing the number of pixels (N/2×N/2) in the output of previous captured image 210 with dimension (N×N). The system 110 takes a maximum value of a filter matrix and store in their corresponding pixel of transformation image, which may have been achieved by pooling. The maximum number of values in pixels represents the object in the image 312. In operation, the input image 302 may go through a filtration process through the CNN 304. The convolution neural layer & max pooling layer of the CNN 304 may segregate the image 302 into a classification of objects 310. In an example, the plurality of objects 220 The convolution neural layer & max pooling layer may apply a linear vector method 306 to determine the principal object 225 for example, a human face from the plurality of objects 220. The linear vector method 306 may be applied on the plurality of objects 220 to determine a set of attributes, which may be in the form of an image fully connected layer 308. The fully connected layers may connect every neuron in one layer to every neuron in another layer. It is in principle the same as the traditional multi-layer perceptron neural network (MLP). The flattened matrix goes through a fully connected layer to classify the images. The image fully connected layer 308 may lead to the generation of an output image 312. When the entire process is complete, system 110 may generate a new representation of image 312 for the input image 302. The output image 312 may include the input image 302 along with various boxes forming boundaries for the classification of objects 310. The output image 312 may also include a box identifying the principal object 225. The output image 312 and the principal object 225 may be used hereinafter for processing the identity creation requirement 205.

Figure 4:
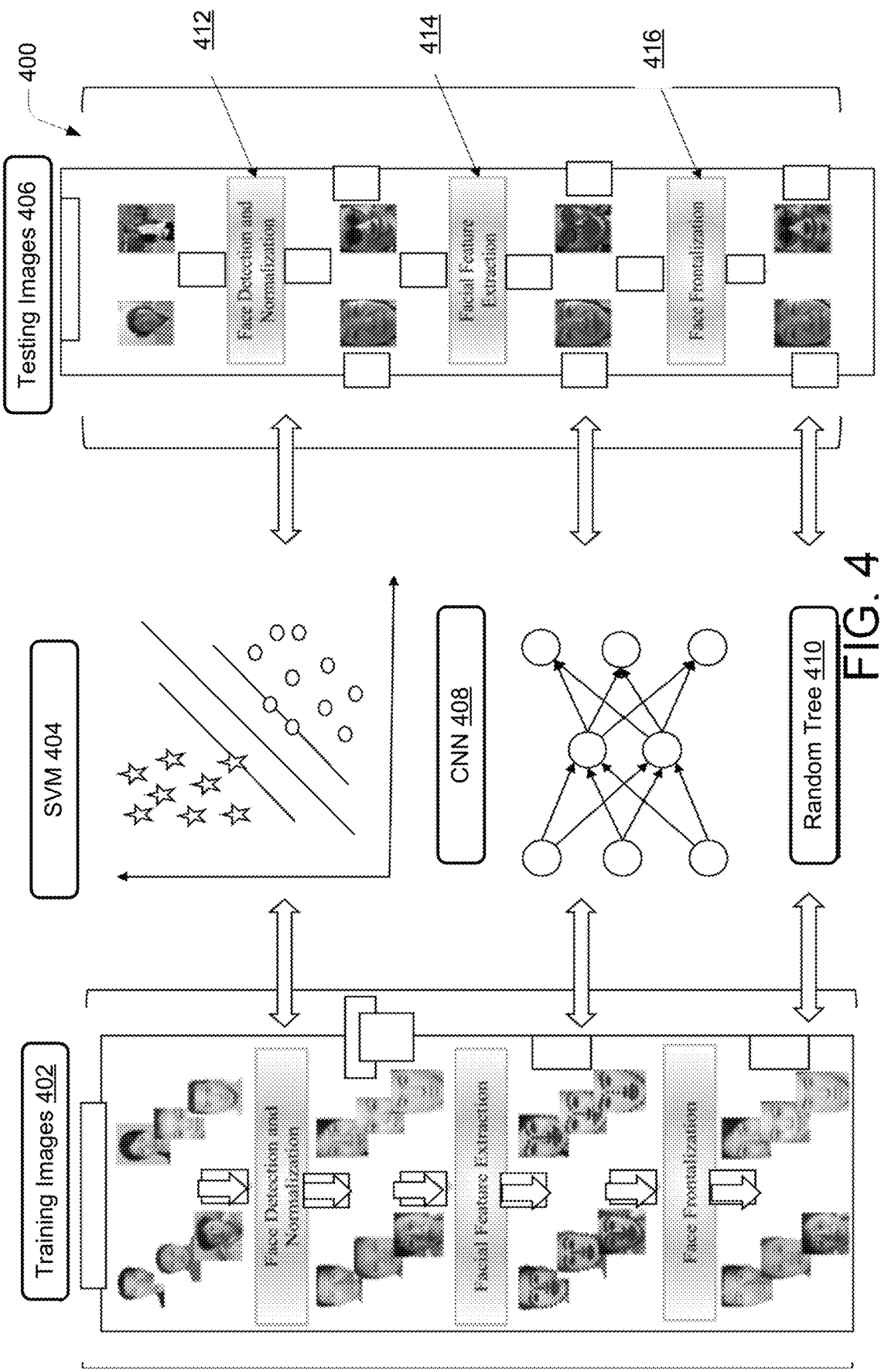
FIG. 4 illustrates a model training process for persona generation using the intelligent persona generation system, according to an example embodiment of the present disclosure.

FIG. 4 illustrates a model training process 400 for training the system 110 for recognizing and patterning the image 210 for persona generation using the intelligent persona generation system 110, according to an example embodiment of the present disclosure. The system training process 400 (referred to as the process 400 hereinafter) may include a database 402. The database 402 may include a plurality of training images. As mentioned above, the system 110 may form the pre-existing library 235 using various test case images from various volunteers. In an example, the database 402 may include a plurality of training images from various volunteers provided for system training purpose. The process 400 may also include a database 406. The database 406 may include a plurality of testing image. In an example, the testing images may be from various people for whom the identification number 260 may have to be generated using the system 110. In an example, the database 402 may include images, which may be used to hand-engineer filters used by the DNN, and CNN techniques. The process 400 may be configured so as to implement same DNN, and CNN operations on the database 402, and the database 406.

In accordance with an embodiment of the present disclosure, the process 400 may implement a Support Vector Machine (SVM) algorithm 404 for achieving a face detection and normalization 412. The SVM 404 may be a discriminative classifier formally defined by a separating hyperplane. The SVM 404 may be a supervised learning algorithm. The algorithm outputs an optimal hyperplane which categorizes new examples based on a given set of training data. The SVM 404 may categorize example from the database 406 using the training data from the database 402 for supervised learning.

In accordance with an embodiment of the present disclosure, the process 400 may implement a CNN 408 for achieving a facial feature extraction 414. In an example, the process 400 may train facial clinical indicators CNN using the large-scale dataset for every facial region. The process 400 may split the facial clinical indicators CNN into an Object Validation Dataset (OVD) and a Self-Trained Dataset (STD). The process 400 may deploy Keras with TensorFlow as a backend for such a training operation. The facial feature extraction 414 may include identification and extraction of facial features from the images present in the database 406. In an example, the facial feature extraction 414 may be implemented for the images present in the database 402 for training the system 110.

In accordance with an embodiment of the present disclosure, the process 400 may implement a random tree method 410 for achieving a face frontalization 416. The face frontalization 416 may help to reconstruct frontal facing views which improve the performance of facial landmarks. The processed image may be then passed to the engine to calculate the probability score using a SoftMax function. The Softmax may assign decimal probabilities to each class in a multi-class problem. The Softmax may be implemented through a neural network layer just before the output layer. The Softmax layer may have the same number of nodes as the output layer. The random tree method 410 may be used to train the system 110 and to evaluate pixels importance ranking of a facial photograph for disease prediction learned automatically from the forests of randomized trees. For example, the hotter the pixel (brighter and more yellow), the more important for marking the typical or unique facial features of facial landmark and the higher the pixel ranking may be.

In an example, the fully connected layer (a CNN technique described by FIG. 3) may identify which dimensional vector features may correlate most to a predefined set of classes. For example, if the system 110 may be configured to predict an image of a human in the image 210, the fully connected layer may have high values of human feature attributes. This will result in person detection in an image. The output image may have multiple bounding boxes and multiple class labels. Once the bounding boxes are drawn delineating a face of the homeless person, the system 110 may find the location of key facial landmarks for potential clinical indicators. The system 110 may use a Dlib & a CLM library as a collection of an algorithm for Machine learning (ML). The Dlib is a general purpose cross-platform software library written in the programming language C++. It has a design that is heavily influenced by ideas from a design by contract and component-based software engineering. It is a set of independent software components, which may be open-source software released under a Boost Software License®.

The library may facilitate extraction of different facial landmarks including puffiness under eyes, pale skin, lips, dense acne and so forth in the processed image 210. (explained in detail by FIG. 5).

Various ML tools and techniques may be implemented on all the pre-processed images. Various ML techniques used by the process 400 may include Generalized Linear Models (LM), K-Near Neighbors (KNN), Support Vector Machines (SVM), Forests of Randomized Trees (RT). The LM may include a logistic regression model, the probabilities may be described by the possible outcome of a photograph which was modeled using a logistic function. The output was modeled as a linear combination of input facial information, and the objective function to be minimized with L2 regularization. The KNN may be a neighbors-based learning method. The neighbors-based learning method may be a type of instance-based methods, which simply stored instances of previous learned images. Classification may be then obtained from a majority vote of the nearest neighbors and a final outcome may be then assigned to the class which has the most representatives for the new input. The system 110 may use the KNN algorithm to find the k-nearest instances in the training images from the database 402 and computed the mean outcome as the final prediction for testing images from the database 406. The SVM may be a supervised classifier with a separating hyperplane. Based on a set of training faces marked, training the SVM model which may be a representation of the labeled photographs that could be divided by a clear gap as wide as possible. New photographs may be then mapped into that same space and predicted to a binary category based on which side of the gap they may fall. In accordance with an embodiment of the present disclosure, the system 110 may deploy GoogLeNet as the backbone of the CNN architecture. The GoogLeNet® may refer to an image recognition algorithm developed under the aegis of Google®. The ML techniques described above may be deployed for identifying the age and gender of the homeless person i.e. trying to find how the set of predictors are related to a target, mathematically (explained in detail by use of subsequent images).

Figure 5:
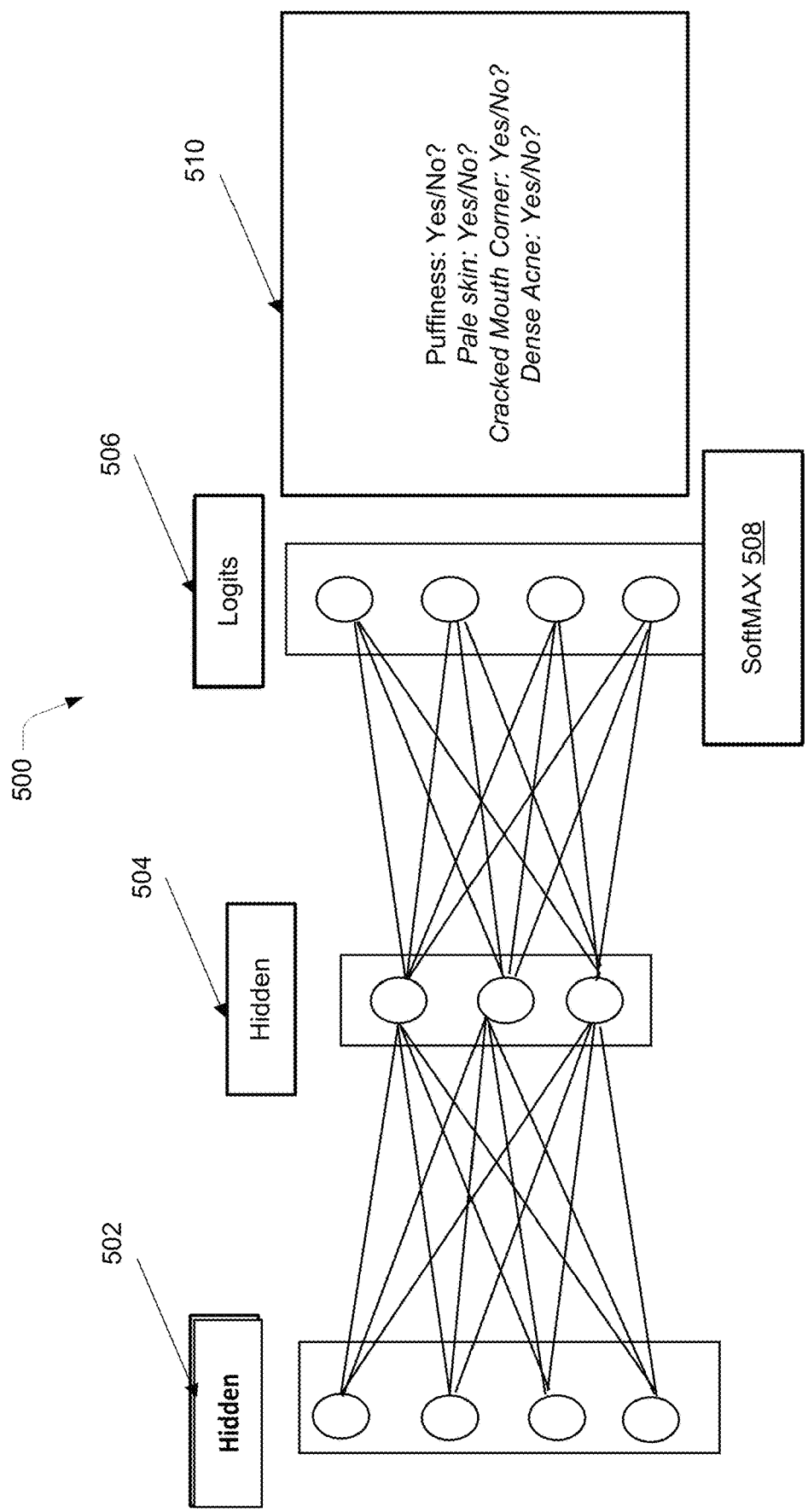
FIG. 5 illustrates a Soft ax layer within a neural network for persona generation using the intelligent persona generation system, according to an example embodiment of the present disclosure.

FIG. 5 illustrates a Softmax layer within a neural network diagram 500 (referred to as the neural network 500 hereinafter) for persona generation using the intelligent persona generation system 110, according to an example embodiment of the present disclosure. As mentioned above, the process 400 may implement a random tree method 410 for achieving the face frontalization 416. The face frontalization 416 may be accomplished through the neural network 500. The neural network 500 may help to reconstruct frontal facing views which improve the performance of facial landmarks. As mentioned in FIG. 3 the LVM 306 may be implemented on the input image 302 to generate the image fully connected layer 308. The image fully connected layer 308 may comprise a hidden component 502, a second hidden component 504, and a logits component 506. Logits may be a function that maps probabilities ([0, 1]) to R ((−inf, inf)) Probability of 0.5 corresponds to a logit of 0. Negative logit may correspond to probabilities less than 0.5, positive to >0.5. As mentioned above, the fully connected layer (a CNN technique described by FIG. 3) may identify which dimensional vector features may correlate most to a predefined set of classes. For example, if the system 110 may be configured to predict an image of a human in the image 210, the fully connected layer may have high values of human feature attributes. This will result in person detection in an image. The output image may have multiple bounding boxes and multiple class labels. Once the bounding boxes are drawn delineating a face of the homeless person, the system 110 may find the location of key facial landmarks for potential clinical indicators. The system 110 may use a Dlib & a CLM library as a collection of an algorithm for Machine learning (ML). The Dlib is a general purpose cross-platform software library written in the programming language C++. It has a design that is heavily influenced by ideas from a design by contract and component-based software engineering. It is a set of independent software components, which may be open-source software released under a Boost Software License®.

In an example, the hidden component 502, and the second hidden component 504 may constitute that part of the image fully connected layer 308, which may be present in the library. The hidden component 502, and the second hidden component 504 may process the image 210 based on filters present in the library and using CNN techniques described by way of FIG. 3, and FIG. 4. The processed image may be then passed to the logits component 506. The logits component 506 may be an engine to calculate the probability score using a SoftMax function 508. The Softmax 508 may assign decimal probabilities to each class in a multi-class problem. The Softmax 508 may be implemented through a neural network layer just before the output layer. The Softmax function 508 layer may have the same number of nodes as the output layer. The random tree method 410 may be used to train the system 110 and to evaluate pixels importance ranking of a facial photograph for disease prediction learned automatically from the forests of randomized trees. For example, the hotter the pixel (brighter and more yellow), the more important for marking the typical or unique facial features of facial landmark and the higher the pixel ranking may be.

The logits component 506 may lead to an identification 510 through the SoftMax function 508. The identification 510 may comprise testing the image for various parameters. The parameters may be the parameter set 230. In an example, the identification 510 may include testing the image for presence or absence of puffiness, pale skin, dense acne, and cracked mouth corners. In an example, the identification 510 may facilitate prediction of medical conditions in the principal object 225 of the processed image 312.

Figure 6:
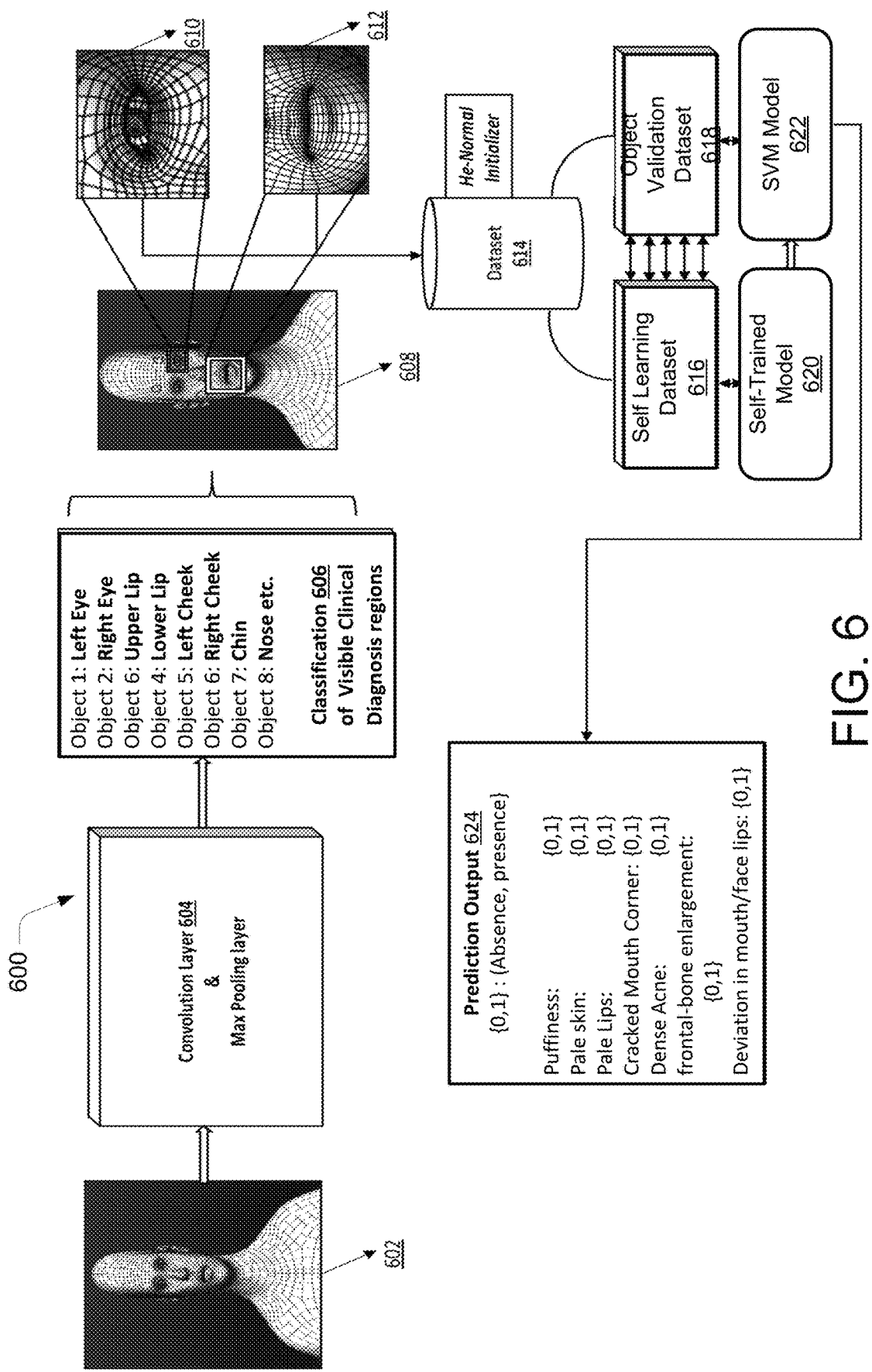
FIG. 6 illustrates a flow diagram for intelligent persona generation system, according to an example embodiment of the present disclosure.

FIG. 6 illustrates a flow diagram for a process 600 for the intelligent persona generation using the system 110, according to an example embodiment of the present disclosure. As mentioned above by way of FIG. 3, the input image 302 may pass through the CNN 304 and the LVM 306 to form the image fully connected layer 308 and finally generating the classification of objects 310. In an example, the output image 312 may undergo further filtration through various AI and ML techniques for identification of the parameter set 230. The process 600 may be used for predicting at least one of a medical condition that principal object 225 identified by the image 312 may be suffering from. The process 600 comprises an input image 602. The input image 602 may include the principal object 225 identified through the process explained by way of FIG. 3. The output image 312 may be used as the input image 602 of the flow diagram 600. In an example, the input image 602 may include the face of a human only identified and obtained from the output image 312. The system 110 may implement a convolution layer and a max pooling layer 604 over the input image 602. The details of the convolution layer and a max pooling layer 604 have been explained by way of FIG. 3. The convolution layer and a max pooling layer 604 may generate a classification 606 from the input image 602. The classification 606 may include various parts of the input image 602 identified as per various filters of the convolution layer and a max pooling layer 604. For example, input image 602 may be a human face, then the convolution layer and a max pooling layer 604 may identify different parts of the human face as a facial composition for generating the classification 606 based on the same. In an example, the classification 606 may include human facial features like a right eye, a left eye, an upper lip, a lower lip, a left cheek, a right cheek, a forehead, a chin, a nose, and the like. The classification 606 may include any visible signs for predicting a medical condition. The input image 602 may be converted into output image 608 through the implementation of the convolution layer and a max pooling layer 604. The output image 608 may include demarcations, for example, a circle drawn around all the facial composition features identified and classified by the classification 606. The output image 608 may further be deconstructed by the system 110 to form an upper face image 610 and a lower face image 612. The upper face image 610 may include a detailed identification of upper facial features, for example, the left eye, the right eye, the forehead, the upper right cheek, the upper left cheek, and the like. The lower face image 612 may include a detailed identification of upper facial features, for example, the lower lip, the upper lip, the nose, the chin, the lower right cheek, the lower left cheek, and the like. The upper face image 610 and the lower face image 612 and accompanying datasets may be stored by the system 110 to form a dataset 414. The system 110 may be configured so that all facial features identified by the classification 606 may be stored as parameters associated with the principal object 225 to form the dataset 614. A He-Normal Initializer may be implemented on the dataset 414. The He-Normal Initializer may include the weights to be initialized keeping in view the size of the previous layer which may help in attaining a global minimum of the cost function faster and more efficiently. The weights may be still random but differ in range depending on the size of the previous layer of neurons. This may provide a controlled initialization hence the faster and more efficient gradient descent.

The dataset 414 may further include a self-training dataset 616, and an object validation dataset 618. As mentioned above, by way of FIG. 4 the system 110 may use the database 402 for training and the database 406 for testing. The self-training dataset 616 may be in communication with the object validation dataset 618. The self-training dataset 616 may include a self-training model 620. The self-training model 620 may implement any of the ML and AI techniques mentioned above for unsupervised learning of the system 110. The object validation dataset 618 may include an SVM model 622. The SVM model 622 has been explained above by way of FIG. 5. The self-training model 620 may provide input and receive input from the self-training dataset 616. The self-training dataset 616 may provide input and receive input from the object validation dataset 618. The object validation dataset 618 may provide input to and receive input from the SVM model 622. After the process of input exchange between the self-training dataset 616, the object validation dataset 618, the self-training model 620, and the SVM model 622, the process 600 may determine a prediction 624. The prediction 624 may include a matrix rated on a presence and an absence scale. The facial features identified by the classification 606 may be assigned a weightage as per analysis from any of the self-training dataset 616, the object validation dataset 618, the self-training model 620, and the SVM model 622 by implementing any of the AI and ML techniques described above. The weightage assigned to the classification 606 may be rated on the presence or the absence of a particular facial feature. For example, the presence of a particular facial feature may be indicated by a value "1" and absence thereof may be indicated by a value "0". In an example, the parameter set 230 may include the prediction 624 along with the presence-absence matrix of various facial features for the principal object 225. As mentioned above, the image classifier 140 may implement the first cognitive learning operation 240 for identifying the parameter set 230. In an example, the first cognitive learning operation 240 may include the convolution layer and a max pooling layer 604. As mentioned above, and explained by way of FIGS. 3-6, the identity generator 150 may implement the second cognitive learning operation 245 to predict at least one of a medical condition, an age group, a visible anatomy code, a gender, and a linguistic preference of the principal object 225. In an example, the second cognitive learning operation 245 may include the self-training dataset 616, the object validation dataset 618, the self-training model 620, and the SVM model 622. The prediction 624 may be obtained by the image generator 150 for implementing the second cognitive learning operation 245 for the generation of the identity model 250 and the identification number 260.

Figure 7:
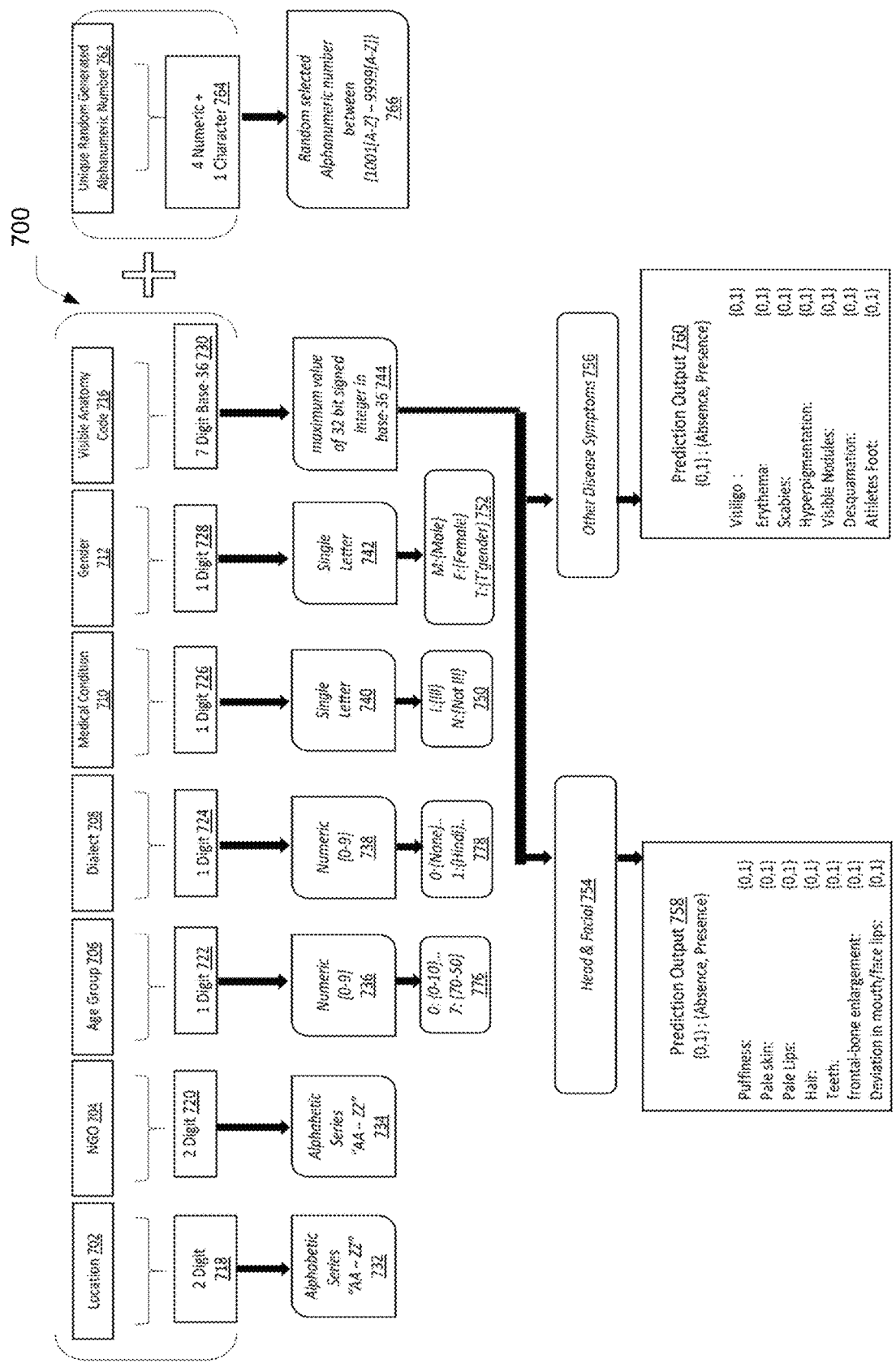
FIG. 7 illustrates a process flowchart for an identity generation based on the intelligent persona generation system, according to an example embodiment of the present disclosure.

FIG. 7 illustrates a process flowchart for a process 700 for the generation of the identification number 260 based on the intelligent persona generation system 110, according to an example embodiment of the present disclosure. The process 700 may amalgamate the results from the prediction 624 and the principal object 225 to form the identification model 250 and deploy the same to determine the identification number

260. The process 700 may include obtaining a location data 702, a sustaining organization, for example, a Non-governmental Organization (NGO) data 704, an age group 706, a linguistic preference data 708, a medical condition data 710, a gender identification 712, and a visible anatomy code 716. The system 110 may be configured so that at least of the location data 702, the NGO data 704, the linguistic preference data 708 may be stored on the pre-existing library 235 of the system 110. The system 110 may be configured so that at least one of the age group 706, the gender identification 712, medical condition data 710, and the visible anatomy code 716 may be determined by the system 110 through implementation of at least one of the artificial intelligence component 230, the first cognitive learning operation 240, and the second cognitive learning operation 245.

In accordance with an embodiment of the present disclosure, the identification number 260 may include an information representation from each of the location data 702, the NGO data 704, the linguistic preference data 708, the age group 706, the gender identification 712, medical condition data 710, and the visible anatomy code 716 along with a unique number 762. The unique number 762 may include a unique random generated an alphanumeric number. The unique number 762 may include a combination 764. The combination 764 may include 4 numeric digits and 1 character. In an example, the combination 764 may lead to a random selection 766. The random selection 766 may include the 4 numeric digits to be between 1001 to 9999. Further, the random selection 766 may include the character to be an alphabet between A-Z. For example, the unique number 762 may be in the range 1001 (A-Z)-9999 (A-Z).

The location data 702 may be assigned a weightage 718. The weightage 718 may be assigned a character representation 732. In an example, the weightage 718 may include 2 digits. The character representation 732 may, for example, be a combination of alphabets from A-Z. For example, the character representation 732 for the weightage 718 may be anywhere in alphabetic series AA-ZZ. The NGO data 704 may be assigned a weightage 720. The weightage 720 may be assigned a character representation 734. In an example, the weightage 720 may include 2 digits. The character representation 734 may, for example, be a combination of alphabets from A-Z. For example, the character representation 734 for the weightage 720 may be anywhere in alphabetic series AA-ZZ. The age group data 706 may be assigned a weightage 722. The weightage 722 may be assigned a character representation 736. In an example, the weightage 722 may include 1 digit. The character representation 736 may, for example, be numeric from 0-9. For example, the character representation 736 for the weightage 722 may be anywhere in numeric series 0-9 with a data intervals range 776 being specified for each value from the numeric series 0-9. For example, the data interval range 776 may be 0-10 years for weightage 722 being 1 digit and the character representation 736 value being "0". Similarly, the data interval range 776 may be 50-70 years for weightage 722 being 1 digit and the character representation 736 value being "7".

The dialect data 708 may be assigned a weightage 724. The weightage 724 may be assigned a character representation 738. In an example, the weightage 724 may include 1 digit. The character representation 738 may, for example, be numeric from 0-9. For example, the character representation 738 for the weightage 724 may be anywhere in numeric series 0-9 with a data intervals range 778 being specified for each value from the numeric series 0-9. For example, the data interval range 778 may be "no dialect preference" for weightage 724 being 1 digit and the character representation 738 value being "0". Similarly, the data interval range 778 may be "Hindi" for weightage 724 being 1 digit and the character representation 738 value being "1". The medical data 710 may be assigned a weightage 726. The weightage 726 may be assigned a character representation 740. In an example, the weightage 726 may include 1 digit. The character representation 740 may, for example, be a single letter. For example, the character representation 740 for the weightage 726 may be anywhere in the alphabetic series A-Z with a data intervals range 750 being specified for each value from the alphabetic series A-Z. For example, the data interval range 750 may be "yes" for weightage 726 being 1 digit and the character representation 740 value being "I". Similarly, the data interval range 750 may be "No" for weightage 726 being 1 digit and the character representation 740 value being "N".

The gender data 712 may be assigned a weightage 728. The weightage 728 may be assigned a character representation 742. In an example, the weightage 728 may include 1 digit. The character representation 742 may, for example, be a single letter. For example, the character representation 742 for the weightage 728 may be anywhere in the alphabetic series A-Z with a data intervals range 752 being specified for each value from the alphabetic series A-Z. For example, the data interval range 752 may be "Male" for weightage 728 being 1 digit and the character representation 742 value being "M". Similarly, the data interval range 752 may be "Female" for weightage 728 being 1 digit and the character representation 742 value is "F". Also, the data interval range 752 may be "Trans-gender" for weightage 728 being 1 digit and the character representation 742 value being "T".

The visible anatomy code 716 may be assigned a weightage 730. The weightage 730 may be assigned a character representation 744. In an example, the weightage 730 may include a 7-digit Base 36 Integer. The character representation 744 may, for example, be the maximum value of a 32-bit signed integer in base-36. The character representation 744 may further include a head and facial representation 754 and a disease symptom representation 756. The facial representation 754 and the disease symptom representation 756 may be determined through the implementation of either of the first cognitive learning operation 240 and the second cognitive learning operation 245. The facial representation 754 may further include a prediction 754. The prediction 758 be similar to the prediction 624 described above. The disease symptom representation 756 may include a prediction 760. The prediction 760 may be based on the implementation of either of the first cognitive learning operation 240 and the second cognitive learning operation 245 on the principal object to screen for any visible symptoms for a particular medical condition like vitiligo, erythema, scabies, hyper-pigmentation, visible nodules, desquamation, athletes' foot, and the like. Most of the predictions covered by the prediction 760 may be assumptions based on an analysis of visible physical symptoms. The system 110 may generate the identification number 260 for a person based on the character representation 732, the character representation 734, the character representation 736, the character representation 738, the character representation 740, the character representation 742, the character representation 744, and the random number 762. The identification number 260 may be distinctive to the person it has been generated for.

Figure 8:
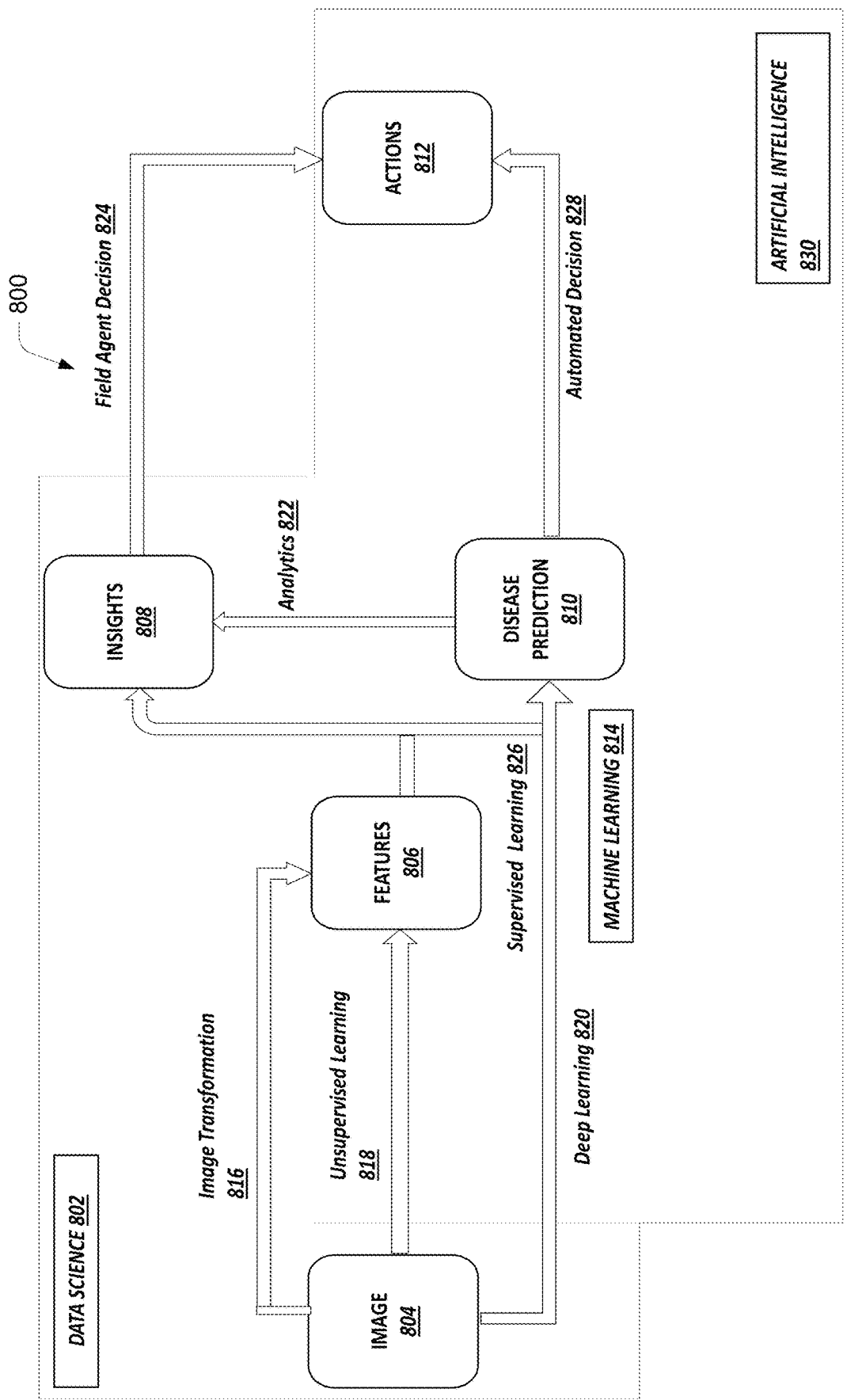
FIG. 8 illustrates a process flowchart of algorithmic details and analytical models for intelligent persona generation system, according to an example embodiment of the present disclosure.

FIG. 8 illustrates a process flowchart of algorithmic details and analytical models for intelligent persona generation system 110, according to an example embodiment of the present disclosure. All methods, tools, techniques, and procedures mentioned by way of FIG. 8 have been described by way of FIGS. 2-7. For the sake of brevity and technical clarity, the same would not be repeated herein.

The system 110 may generate an identity for an individual through an amalgamation of various tools and techniques. The system 110 may deploy a data science component 802, a machine learning component 814, and an artificial intelligence component 830. In an example, the machine learning component 814 may define an overlap between the data science component 802 and the artificial intelligence component 830. The data science component 802 may include an image 804, and an image insights component 808. The machine learning component 814 may include an image features component 806, and a disease prediction 810. The artificial intelligence component 830 may include an action component 812. In accordance with an embodiment of the present invention, the image 804 may be used an input for implementing an unsupervised learning 818 by the machine learning component 814 in order to determine the image features component 806. Further, the image 804 may be used an input by the data science component 802 for implementing an image transformation (described by FIG. 3) for determining the image features component 806. Additionally, the image 804 may be used an input by the machine learning component 814 for implementing deep learning methods (described by way of FIGS. 4 and 5) for generating the disease prediction 810. In an example, an output from the image features component 806 may be used an input by the machine learning component 814 for implementing a supervised learning technique (described by way of FIG. 4) 826 for generating the disease prediction 810. Additionally, the machine learning component 814 may implement the supervised learning technique 826 on the image features component 806 for obtaining the image insights component 808. In an example, the machine learning component 814 may implement an analysis 822 on the disease prediction 810 for generating the image insights component 808.

The image insights component 808 may be forwarded for a field agent decision 824. The field agent decision 824 may be undertaken by a user of the system 110. The field agent decision 824 may lead to the action component 812 through the implementation of the artificial intelligence component 830. In an example, the disease prediction 810 may undergo an automated decision process 828 through the implementation of the artificial intelligence component 830. The automated decision process 828 may lead to the action component 812.

Figure 9:
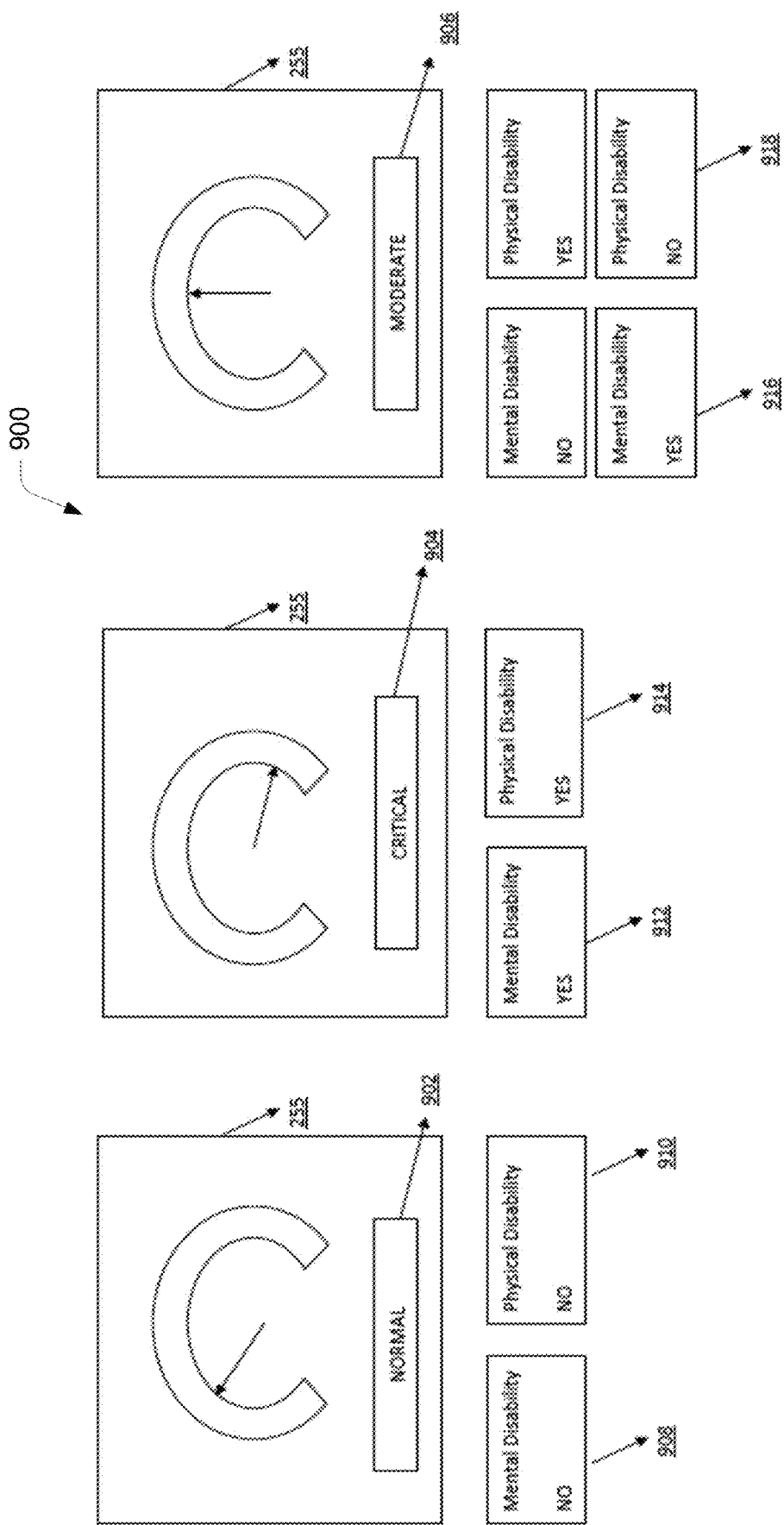
FIG. 9 illustrates a pictorial representation for a use case criticalness indication for a person using the intelligent persona generation system, according to an example embodiment of the present disclosure.

FIG. 9 illustrates a pictorial representation 900 for a use case of criticalness indication for a person using the intelligent persona generation system 110, according to an example embodiment of the present disclosure. The pictorial representation 900. As mentioned above, the identity generator 150 may implement the second cognitive learning operation 245 to determine the criticality indicator 255 for indicating a level of distress of the principal object 225. In an example, the level of distress may include a normal distress level 902, an intermediate distress level 906 and a critical distress level 904. For example, if a person may not appear to be suffering from a mental disability 908 or a physical disability 910, the criticality indicator 255 may determine the level of distress to be at the normal distress level 902. If a person may appear to be suffering from at least one a mental condition 916 or a physical condition 918, the criticality indicator 255 may determine the level of distress to be at the intermediate distress level 906. If a person may appear to be suffering from both of a physical condition 912 and a mental condition 914, the criticality indicator 255 may determine the level of distress to be at the critical distress level 904. The system 110 may provide a remedial action based on the level of distress of the principal object 225 indicated by the criticality indicator 255. The identity generator 150 may further implement the second cognitive operation to determine a change in the level of distress of the principal object 225 indicated by the criticality indicator 255.

Figure 10:
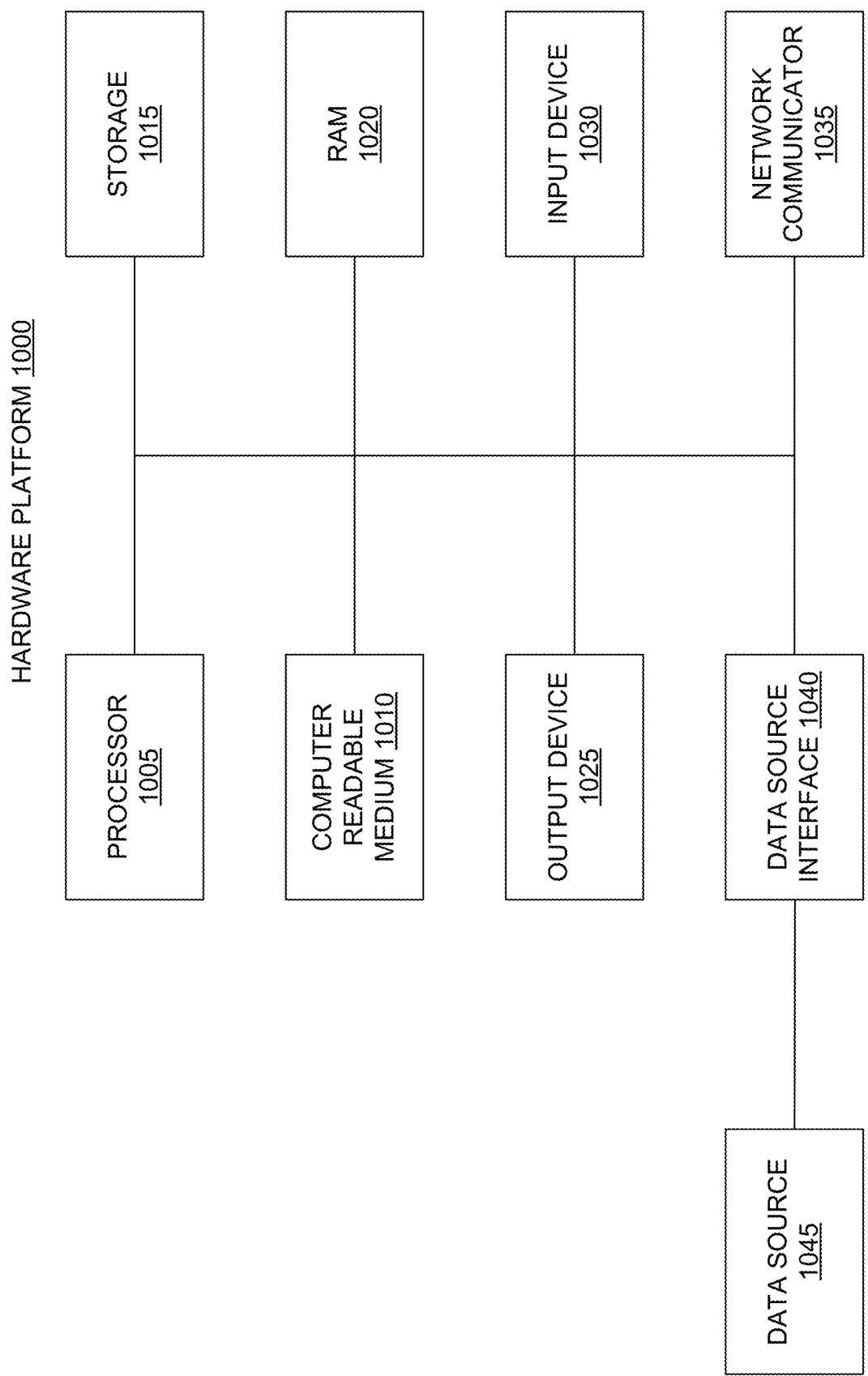
FIG. 10 illustrates a hardware platform for the implementation of the system, according to an example embodiment of the present disclosure.

FIG. 10 illustrates a hardware platform 1000 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1000. The hardware platform 1000 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 10, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1000 may include a processor 1005 that executes software instructions or code stored on a non-transitory computer-readable storage medium 1010 to perform methods of the present disclosure. The software code includes, for example, instructions to gather data and documents and analyze documents. In an example, the image extractor 130, the image classifier 140 and the identity generator 150 may be software codes or components performing these steps.

The instructions on the computer-readable storage medium 1010 are read and stored the instructions in storage 1015 or in random access memory (RAM) 1020. The storage 1015 provides a large space for keeping static data where at least some instructions could be stored for later execution. The stored instructions may be further compiled to generate other representations of the instructions and dynamically stored in the RAM 1020. The processor 1005 reads instructions from the RAM 1020 and performs actions as instructed.

The computer system 1000 further includes an output device 1025 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000.

The input device may include, for example, a keyboard, a keypad, a mouse, or a touchscreen. In an example, the output of the image classifier 140 is displayed on the output device 1025. Each of these output devices 1025 and input devices 1030 could be joined by one or more additional peripherals. In an example, the output device 1025 may be used to display the results of the identity creation requirement 205 205.

A network communicator 1035 may be provided to connect the computer system 1000 to a network and in turn to other devices connected to the network including other clients, servers, data stores, and interfaces, for instance. A network communicator 1035 may include, for example, a network adapter such as a LAN adapter or a wireless adapter. The computer system 1000 includes a data source interface 1040 to access data source 1045. A data source is an information resource. As an example, a database of exceptions and rules may be a data source. Moreover, knowledge repositories and curated data may be other examples of data sources. In an example, the plurality of objects 220 220 may be the data source 1045.

Figure 11A:
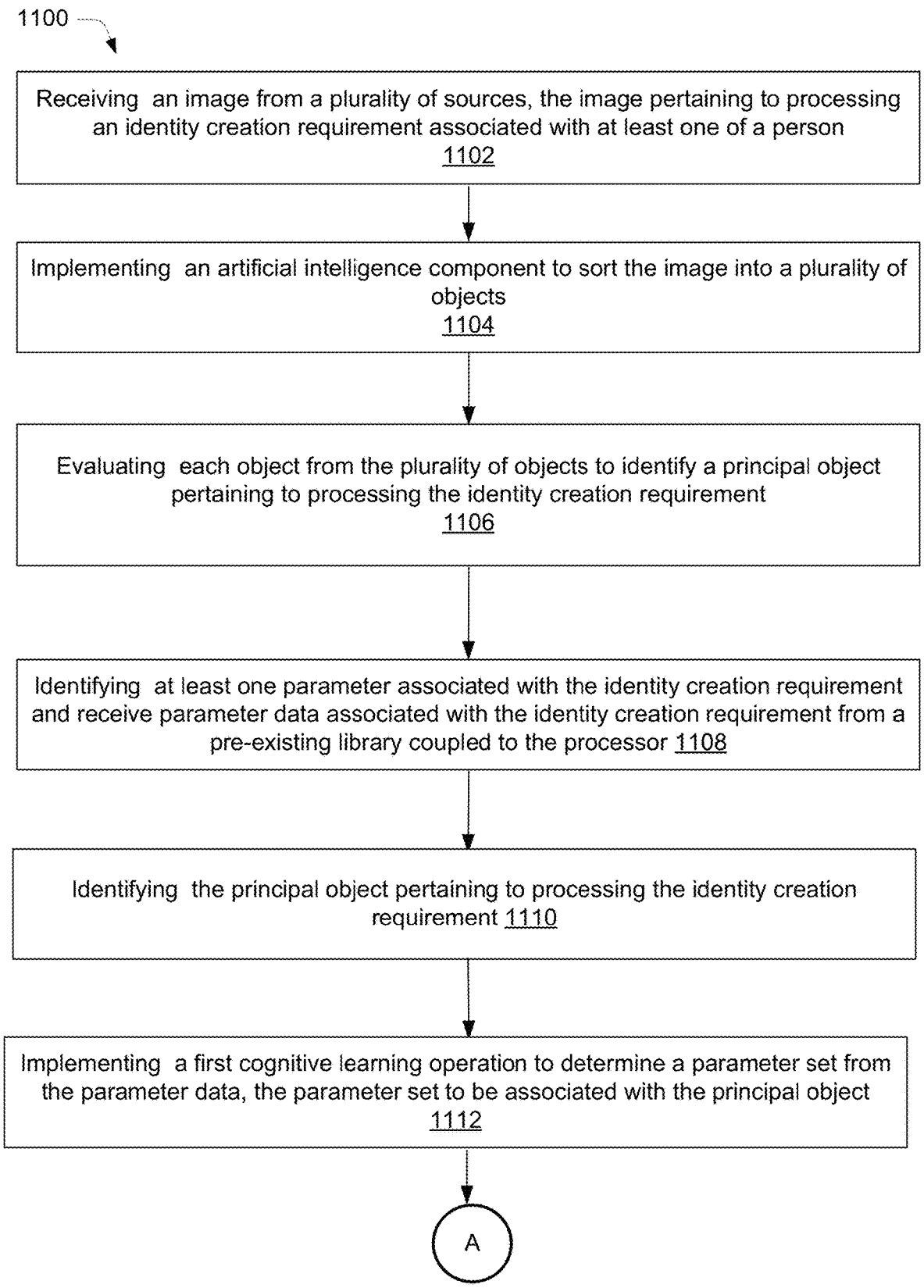
FIGS. 11A and 11B illustrate a process flowchart for the intelligent persona generation system, according to an example embodiment of the present disclosure.
Figure 11B:
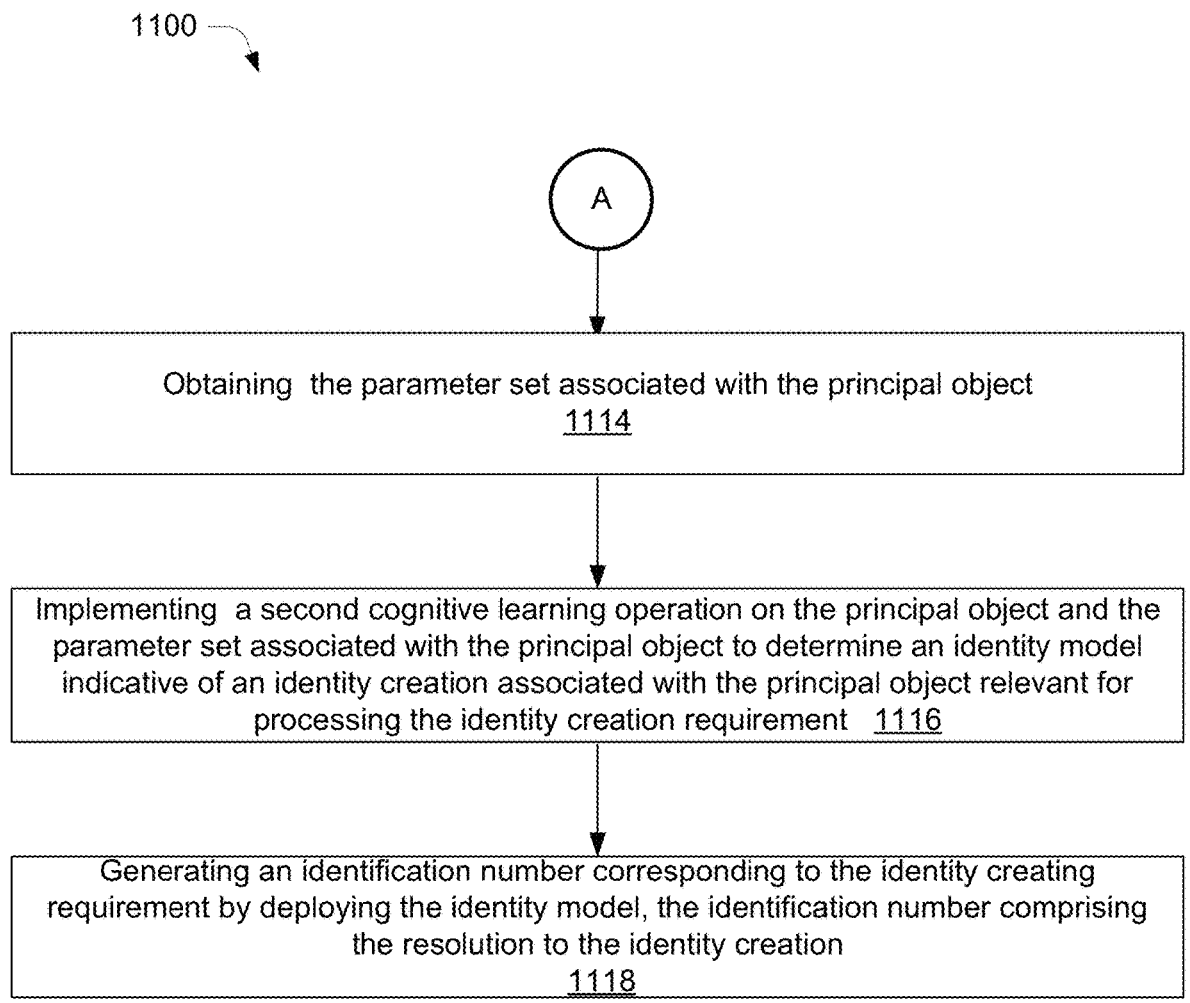

FIGS. 11A and 11B illustrate a method 1100 for the intelligent persona generation system 110 according to an example embodiment of the present disclosure.

It should be understood that method steps are shown here for reference only and other combination of the steps may be possible. Further, the method 1100 may contain some steps in addition to the steps shown in FIG. 11. For the sake of brevity, construction and operational features of the system 110 which are explained in detail in the description of FIG. 1, FIG. 2, FIG. 3, FIG. 4, FIG. 5, FIG. 6, FIG. 7, FIG. 8, FIG. 9, and FIG. 10 are not explained in detail in the description of FIG. 11. The method 1100 may be performed by a component of the system 110, such as the processor 120, the image extractor 130, the image classifier 140 and the identity generator 150.

At block 1102, an image 210 may be received from a user. The image 210 may be received from a plurality of sources. The image 210 may pertain to processing an identity creation requirement 205 associated with at least one of a person.

At block 1104, an artificial intelligence component 215 may be implemented to sort the image 210 into a plurality of objects 220.

At block 1106, each of the domains from the plurality of objects 220 220 of the parameter data may be evaluated to identify a principal object 225 pertaining to processing the identity creation requirement 205.

At block 1108, at least one parameter associated with the identity creation requirement 205 may be identified. The method may further include receiving parameter data associated with the identity creation requirement 205 from a pre-existing library 235 coupled to the processor. In an example, the parameter data present in the pre-existing library 235 may further include at least one of a geographical locations, a sustaining organization, an age group, and a linguistic preference for the principal object 225.

At block 1110, the principal object 225 pertaining to processing the identity creation requirement 205 may be identified.

At block 1112, a first cognitive learning operation 240 may be implemented to determine a parameter set 230 from the parameter data, the parameter set 230 to be associated with the principal object 225

At block 1114, the parameter set 230 associated with the principal object 225 may be obtained.

At block 1116, a second cognitive learning operation 245 may be implemented on the principal object 225 and the parameter set 230 associated with the principal object 225 to determine an identity model 250 indicative of an identity creation associated with the principal object 225 relevant for processing the identity creation requirement 205.

At block 1118, an identification number 260 may be generated corresponding to the identity creating requirement 205 by deploying the identity model 250, the identification number 260 comprising the resolution to the identity creation.

In an example, the method 1100 further comprises generating the identity model 250, by a processor, as an electronic document in response to the identity creation requirement 205. in an example, the second cognitive operation may be implemented to determine a criticality indicator 255 for indicating a level of distress of the principal object 225. In an example, the second cognitive operation may be implemented to predict at least one of a medical condition, an age group, a visible anatomy code, a gender, and a linguistic preference of the principal object 225. In an example, the method 1100 further comprises the identity model 250 to be distinctive to the principal object 225.

In an example, the method 1100 may be practiced using a non-transitory computer-readable medium. In an example, the method 1100 may be a computer-implemented method.

The present disclosure provides for continuous collection and analysis of information and may also provide relevant recommendations on demand, allowing users to shift from event-based to continuous sourcing. The present disclosure may substantially reduce the time required in responding to market opportunities. The present disclosure for intelligent persona generation system 230 may eliminate substantial time spent on labor-intensive analysis, providing a huge boost in agility, responsiveness, and productivity.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
  a processor; and
  a memory storing instructions, which when executed by the processor, cause the system to:
    receive an image from a plurality of sources, the image pertaining to processing an identity creation requirement associated with at least one person;
    implement an artificial intelligence component to sort the image into a plurality of objects;
    evaluate each object from the plurality of objects to identify a principal object pertaining to processing the identity creation requirement;
    identify at least one parameter associated with the identity creation requirement and receive parameter data associated with the identity creation requirement from a pre-existing library coupled to the processor, wherein the parameter data present in the pre-existing library further comprises at least one of a geographical location, a sustaining organization, an age group, and a linguistic preference for the principal object;
    identify the principal object pertaining to processing the identity creation requirement;

implement a first cognitive learning operation to determine a parameter set from the parameter data, the parameter set to be associated with the principal object;
obtain the parameter set associated with the principal object;
implement a second cognitive learning operation on the principal object and the parameter set associated with the principal object to determine an identity model indicative of an identity creation associated with the principal object relevant for processing the identity creation requirement; and
generate an identification number corresponding to the identity creating requirement by deploying the identity model, the identification number comprising the resolution to the identity creation.

2. The system as claimed in claim 1, wherein the system is to further implement the second cognitive operation to determine a criticality indicator for indicating a level of distress of the principal object.

3. The system as claimed in claim 2, wherein the system is to provide a remedial action based on the level of distress of the principal object indicated by the criticality indicator.

4. The system as claimed in claim 2, wherein the system is to further implement the second cognitive operation to determine a change in the level of distress of the principal object indicated by the criticality indicator.

5. The system as claimed in claim 1, wherein the identification number is to further include information on at least one of a geographical location, a sustaining organization, a medical condition, an age group, a visible anatomy code, a gender, and a linguistic preference of the principal object.

6. The system as claimed in claim 1, wherein the system is to further implement the second cognitive learning operation to predict at least one of a medical condition, an age group, a visible anatomy code, a gender, and a linguistic preference of the principal object.

7. A method comprising:
receiving, by a processor, an image from a plurality of sources, the image pertaining to processing an identity creation associated with at least one person;
implementing, by the processor, an artificial intelligence component to sort the image into a plurality of objects;
evaluating, by the processor, each object from the plurality of objects to identify a principal object pertaining to processing the identity creation requirement;
identifying, by the processor, at least one parameter associated with the identity creation requirement and receive parameter data associated with the identity creation requirement from a pre-existing library coupled to the processor, wherein the parameter data present in the pre-existing library further comprises at least one of a geographical location, a sustaining organization, an age group, and a linguistic preference for the principal object;
identifying, by the processor, the principal object pertaining to processing the identity creation requirement;
implementing, by the processor, a first cognitive learning operation to determine a parameter set from the parameter data, the parameter set to be associated with the principal object;
obtaining, by the processor, the parameter set associated with the principal object;
implementing, by the processor, a second cognitive learning operation on the principal object and the parameter set associated with the principal object to determine an identity model indicative of an identity creation associated with the principal object relevant for processing the identity creation requirement and
generating, by the processor, an identification number corresponding to the identity creating requirement by deploying the identity model, the identification number comprising the resolution to the identity creation.

8. The method as claimed in claim 7, wherein the method further comprises implementing, by the processor, the second cognitive operation to determine a criticality indicator for indicating a level of distress of the principal object.

9. The method as claimed in claim 8, wherein the method further comprises providing, by the processor, a remedial action based on the level of distress of the principal object indicated by the criticality indicator.

10. The method as claimed in claim 8, wherein the method further comprises implementing, by the processor the second cognitive operation to determine a change in the level of distress of the principal object indicated by the criticality indicator.

11. The method as claimed in claim 7, wherein the identification number is to further include information on at least one of geographical location, a sustaining organization, a medical condition, an age group, a visible anatomy code, a gender, and a linguistic preference of the principal object.

12. The method as claimed in claim 7, wherein the method further comprises implementing, by the processor, the second cognitive learning operation to predict at least one of a medical condition, an age group, a visible anatomy code, a gender, and a linguistic preference of the principal object.

13. A non-transitory computer readable medium including machine readable instructions that are executable by a processor to:
receive an image from a plurality of sources, the image pertaining to processing an identity creation requirement associated with at least one person;
implement an artificial intelligence component to sort the image into a plurality of objects;
evaluate each object from the plurality of objects to identify a principal object pertaining to processing the identity creation requirement;
identify at least one parameter associated with the identity creation requirement and receive parameter data associated with the identity creation requirement from a pre-existing library coupled to the processor, wherein the parameter data present in the pre-existing library further comprises at least one of a geographical location, a sustaining organization, an age group, and a linguistic preference for the principal object;
identify the principal object pertaining to processing the identity creation requirement;
implement a first cognitive learning operation to determine a parameter set from the parameter data, the parameter set to be associated with the principal object;
obtain the parameter set associated with the principal object;
implement a second cognitive learning operation on the principal object and the parameter set associated with the principal object to determine an identity model indicative of an identity creation associated with the principal object relevant for processing the identity creation requirement; and
generate an identification number corresponding to the identity creating requirement by deploying the identity model, the identification number comprising the resolution to the identity creation.

14. The non-transitory computer-readable medium of claim 13, wherein the processor is to implement the second cognitive operation to determine a criticality indicator for indicating a level of distress of the principal object.

15. The non-transitory computer-readable medium of claim 14, wherein the processor is to provide a remedial action based on the level of distress of the principal object indicated by the criticality indicator.

16. The non-transitory computer-readable medium of claim 14, wherein the processor is to implement the second cognitive operation to determine a change in the level of distress of the principal object indicated by the criticality indicator.

17. The non-transitory computer-readable medium of claim 13, wherein the identification number is to further include information on at least one of a geographical location, a sustaining organization, a medical condition, an age group, a visible anatomy code, a gender, and a linguistic preference of the principal object.

18. The non-transitory computer-readable medium of claim 13, wherein the processor is to implement the second cognitive learning operation to predict at least one of a medical condition, an age group, a visible anatomy code, a gender, and a linguistic preference of the principal object.

* * * * *